United States Patent [19]

Kimura

[11] Patent Number: 6,097,550
[45] Date of Patent: Aug. 1, 2000

[54] OPTICAL SYSTEM AND IMAGE TAKING APPARATUS

[75] Inventor: Kenichi Kimura, Kawasaki, Japan

[73] Assignee: Canon Kabushiki Kaisha, Tokyo, Japan

[21] Appl. No.: 09/021,460

[22] Filed: Feb. 10, 1998

[30] Foreign Application Priority Data

Feb. 12, 1997 [JP] Japan .................................. 9-043003

[51] Int. Cl.⁷ .............................. G02B 17/00; G02B 9/00
[52] U.S. Cl. ......................... 359/729; 359/630; 359/631; 359/634; 359/638
[58] Field of Search ................................. 359/630, 631, 359/634, 636, 638, 729

[56] References Cited

U.S. PATENT DOCUMENTS

| | | | |
|---|---|---|---|
| 4,775,217 | 10/1988 | Ellis | 350/538 |
| 5,453,877 | 9/1995 | Gerbe et al. | 359/633 |
| 5,699,194 | 12/1997 | Takashashi | 359/633 |
| 5,790,311 | 8/1998 | Togino | 359/630 |
| 5,825,560 | 10/1998 | Ogura et al. | 359/822 |
| 5,917,662 | 6/1999 | Sekita | 359/729 |
| 5,973,858 | 10/1999 | Sekita | 359/729 |
| 5,995,287 | 11/1999 | Sekita | 359/599 |
| 5,999,311 | 12/1999 | Nanba et al. | 359/365 |
| 6,021,004 | 2/2000 | Sekita et al. | 359/676 |

FOREIGN PATENT DOCUMENTS

| | | |
|---|---|---|
| 0 730 169 | 9/1996 | European Pat. Off. . |
| 0 730 179 | 9/1996 | European Pat. Off. . |
| 0 730 180 | 9/1996 | European Pat. Off. . |
| 0 788 003 | 8/1997 | European Pat. Off. . |
| 0 790 513 | 8/1997 | European Pat. Off. . |
| 0 802 436 | 10/1997 | European Pat. Off. . |
| 2-297516 | 12/1990 | Japan . |
| 5-12704 | 1/1993 | Japan . |
| 6-139612 | 5/1994 | Japan . |
| 8-292368 | 11/1996 | Japan . |
| 8-292371 | 11/1996 | Japan . |
| 8-292372 | 11/1996 | Japan . |

OTHER PUBLICATIONS

Patent Abstracts of Japan, vol. 97, No. 3 (JP 08–292368, Nov. 5, 1996), Mar. 31, 1997.

*Primary Examiner*—Georgia Epps
*Assistant Examiner*—Saeed Seyrafi
*Attorney, Agent, or Firm*—Fitzpatrick, Cella, Harper & Scinto

[57] ABSTRACT

There is disclosed an optical system adapted for use in an image taking device. The optical system comprises an optical element having an entrance surface, a curved internal reflective surface and an exit surface on the surface of a transparent member composed for example glass, in which the light beam from an object is refracted at the entrance surface, thus being incident on the interior of the optical element, then is internally reflected by the reflective surface and refracted at the exit surface, thus emerging from the optical element and focusing on an imaging plane. The internal reflective surface is an off-axis reflective surface, and the entrance surface, the internal reflective surface or surfaces and the exit surface are so designed as to cancel the chromatic aberration generated at the refractive surfaces, while satisfactorily correcting other optical aberrations.

30 Claims, 17 Drawing Sheets

FIG. 3
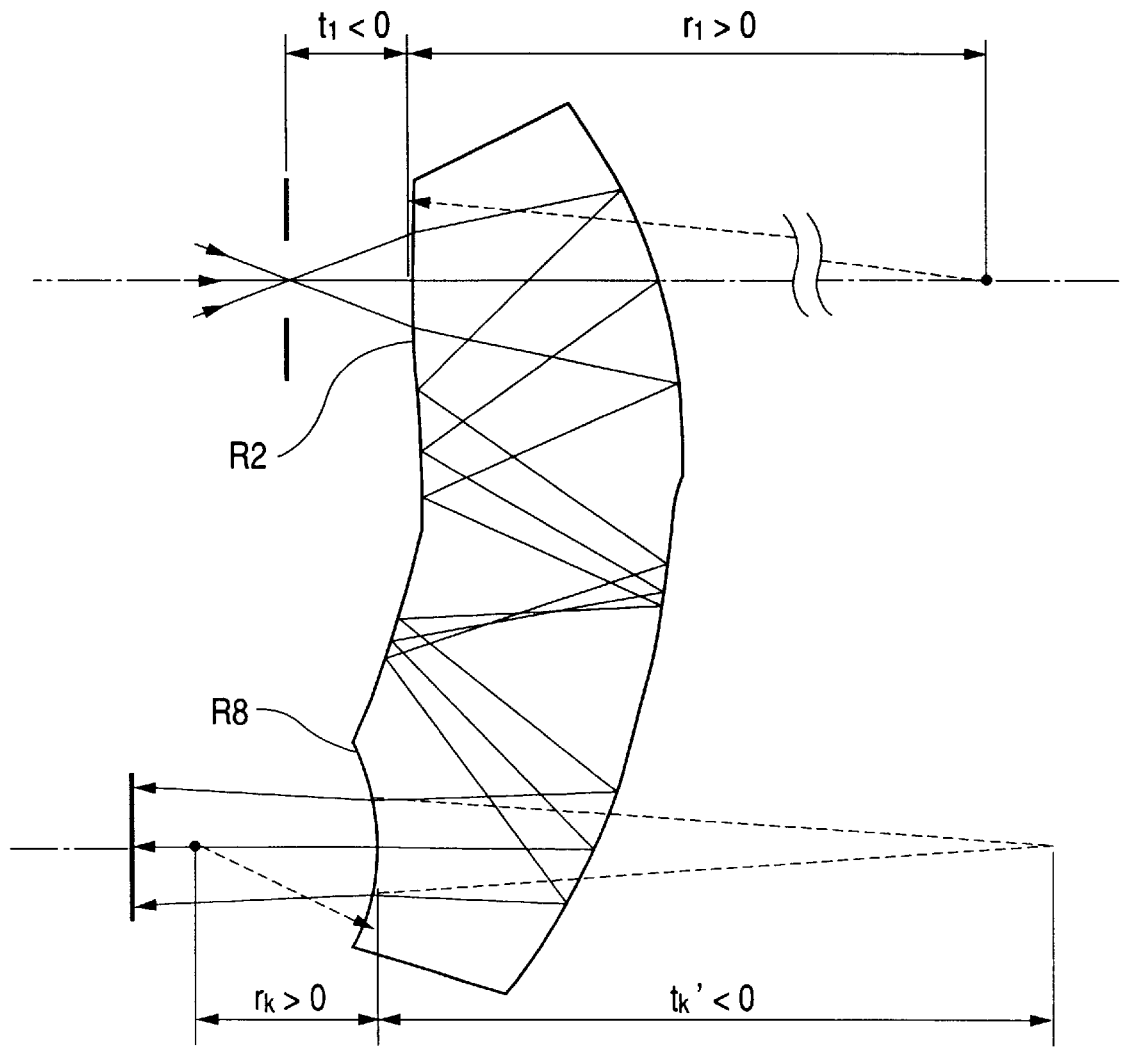
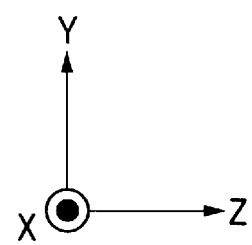

OPTICAL SYSTEM AND IMAGE TAKING APPARATUS

BACKGROUND OF THE INVENTION

1. Field of the Invention

The present invention relates to an optical system and an image taking apparatus, and more particularly to an optical system and an image taking apparatus capable of forming an image of the object utilizing an optical element with one or plural internal reflecting surfaces and adapted for use in a video camera, a still video camera, an observation apparatus or the like.

2. Related Background Art

There have already been proposed various image taking optical systems and observation optical systems based on a refractive system. For improving the imaging performance, these optical systems are well corrected for aberrations such as the spherical aberration, coma aberration, imaging plane curvature etc. for the reference wavelength, and are corrected for the chromatic aberration (so-called achromatic) in the visible wavelength range.

In the optical system utilizing ordinary lenses, it is basically impossible to achieve achromatic property with a single lens, so that the correction of chromatic aberration is realized by the combination of plural lenses of mutually different dispersions.

On the other hand, there have also been proposed various image taking optical systems utilizing a reflecting surface such as a concave mirror or a convex mirror. Since such reflecting surface does not in principle generate the chromatic aberration, such optical systems are widely utilized in telescopes in which the imaging performance is significantly affected by the chromatic aberration. FIG. 17 is a schematic view of a mirror optical system composed of a concave mirror and a convex mirror.

In the mirror optical system shown in FIG. 17, a light beam 104 from an object is reflected by a concave mirror 101, thus being directed toward the object in a gradually converging state, then reflected by a convex mirror 102 and is focused on an imaging plane 103.

The optical system shown in FIG. 17 constitutes the basic configuration of a so-called Cassegrain reflective telescope, in which a telescopic optical system with a large entire length composed of ordinary lenses is folded up with two mutually opposed mirrors to reduce the entire length of the optical system, and the generation of chromatic aberration, inherent to the telescopic lens, is avoided by the use of reflective mirrors.

In this manner the replacement of the lenses with the mirrors allows to efficiently fold back the optical path and to obtain a compact optical system without the influence of chromatic aberration, but it is difficult, for a cataptoric optical system consisting solely of mirrors, to satisfactorily correct all the aberrations of the entire system.

For this reason, there are also known optical systems employing a mirror system and a lens system in combination for increasing the freedom of aberration correction, and capable of correcting the aberrations in the entire system by a balanced combination of such mirror system and lens system. FIG. 18 shows an example of a catadioptoric optical system employing the combination of a mirror system and lens system. Referring to FIG. 18, a light beam 116 from an object is refracted by lenses 111, 112, then reflected by a concave mirror 113, thus being directed toward the object in a gradually converging state, then reflected by a convex mirror 114 and focused on an imaging plane 115. The lens system is so designed as to cancel the aberrations generated by the mirrors.

However, the lens system is composed of the combination of a convex lens 111 and a concave lens 112 in order to correct the chromatic aberration. Therefore, though the optical system is made compact by the efficient folding of the optical path by the mirror system alone, the entire optical system becomes bulky, requiring lenses of a large diameter. Also as the number of optical components becomes larger, there is required a precise assembling operation for these optical components. In particular it is essential to precisely adjust the position and angle of each mirror, since strict relative positional precision is required between the mirrors and for each mirror relative to the lenses.

For avoiding such drawback, there has been proposed, for example in the Japanese Patent Laid-open Application No. 8-292371, to form the mirror system, or the mirror system and the lens system, as a single block thereby avoiding the assembling error of the optical components in the assembling operation.

On the other hand, there are already known optical components having plural reflective surfaces on the surface of a single block, for example optical prisms such as a polo prism or a pentagonal roof prism employed in the view finder optical system.

These prisms, having plural reflecting surfaces in an integral manner with a precise positional relationship, do not require the mutual positional adjustment of the reflecting surfaces. However, these prisms are intended to invert the image by varying the advancing direction of the light, and the reflecting surfaces are composed of flat planes.

On the other hand, there are also known prism optical systems having curved reflecting surfaces.

FIG. 19 is a schematic view of an observation optical system disclosed in the U.S. Pat. No. 4,775,217. This observation optical system is designed to observe an external scene and also to observe an image displayed on an information display member, in an overlapping manner with the scene.

In this observation optical system, a light beam 125 emerging from a display surface of the information display member 121 is directed to the object by reflection by a surface 122 and is incident on a concave half mirror 123. After being reflected by the half mirror surface 123, the display light beam 125 becomes a substantially parallel light beam by the refractive force of the concave surface 123, then is transmitted and refracted by surface 122 and is incident on the pupil 124 of the observer, thereby causing the observer to recognize an enlarged false image of the displayed image.

On the other hand, a light beam 126 from an object is incident on a surface 127 approximately parallel to the reflective surface 122, is refracted by the surface 127 and is incident on the concave half mirror 123. A part of the object light beam 126 is transmitted by the concave surface 123, bearing an evaporated half-transmitting film, then transmitted and refracted by the surface 122 and is incident on the pupil 124 of the observer. Consequently the observer observes the displayed image overlapping with the external scene.

FIG. 20 is a schematic view of an observation optical system disclosed in the Japanese Patent Laid-open Application No. 2-297516. This optical system is also designed to observe the external scene and also to observe an image, displayed on an information display member, in an overlapping manner.

In this observation optical system, a light beam 134 emerging from an information display member 130 is transmitted by a flat plane 137 constituting a prism Pa, thereby being incident on the prism Pa, and is incident on a parabolic reflective surface 131. Being reflected by the parabolic reflective surface 131, the display light beam 134 becomes a converting light beam focusing on a focal plane 136. The display light beam 134, reflected by the reflective surface 131, reaches the focal plane 136 by repeating total reflections by two parallel flat surfaces 137, 138 constituting the prism Pa, whereby the entire optical system can be made thinner.

The display light beam 134 emerging from the focal plane 136 in diverging state repeats total reflections on the flat surfaces 137, 138 and is incident on a parabolic half mirror 132. It is thus reflected by the half mirror 132 and is converted into a substantially parallel light beam by the refractive force thereof, thereby forming an enlarged false image of the displayed image. It is then transmitted by a surface 137 and is incident on the pupil 133 of the observer, whereby the observer can observe the displayed image.

On the other hand, a light beam 135 from an external object is transmitted by a surface 138b constituting a prism Pb, then transmitted by a parabolic half mirror 132 and the surface 137 and is incident on the pupil 133 of the observer. Consequently the observer can observe the displayed image in an the external scene in overlapping manner.

However, in the above-explained optical system in which plural reflective surfaces are formed in a single block, no particular correction of the aberrations is intended, and the chromatic aberration generated at the entrance and exit surfaces becomes a problem because such block is constituted by a dispersing medium such as glass.

Furthermore, an optical head for the optical pickup, disclosed for example in the Japanese Patent Laid-open Application Nos. 5-12704 and 6-139612, reflects the light from a semiconductor laser by a Fresnel surface or a hologram surface formed on a prism, then focuses the light onto a disk surface and guides the light reflected from the disk surface to a detector. Such optical system for the optical pickup, being designed for the laser light, has an extremely narrow wavelength range, and the correction of the chromatic aberration over the visible wavelength range, as in the image taking optical system, is not contemplated at all.

SUMMARY OF THE INVENTION

The object of the present invention is to provide an optical system and an image taking apparatus, capable of satisfactorily correcting the chromatic aberration.

The above-mentioned object can be attained, according to a first aspect of the present invention, by an optical system and an image taking apparatus comprising an optical element having an entrance surface, an internal reflective surface and an exit surface on the surface of a transparent member:

wherein the light beam from an object is refracted at the entrance surface, thus being incident on the interior of the optical element, then is internally reflected by the reflective surface and refracted at the exit surface, thus emerging from the optical element and focusing on an imaging plane;

a reference axis is defined by the path of a ray emerging from the center of the object, passing through the center of a diaphragm and reaching the center of the imaging plane, and the distance is measured along the reference axis; and wherein parameters A, A', B and B' are defined by:

$$A=(1/r_1-1/s_1)$$

$$A'=(1/r_k-1/s_k')$$

$$B=(1/s_1-1/t_1)$$

$$B'=(1/s_k'-1/t_k')$$

in which $r_1$ is the radius of curvature of the entrance surface, $s_1$ is the distance from the entrance surface to the object, $t_1$ is the distance from the entrance surface to the position of the entrance pupil, $r_k$ is the radius of curvature of the exit surface, $s_k'$ is the distance from the exit surface to the image, and $t_k'$ is the distance from the exit surface to the position of the exit pupil; and the optical element, the object point and the image point are so selected that ratios A/A' and B/B' satisfy the following relations:

$$0.5<(A/A')/C<2.0$$

$$0.3<(B/B')/C<2.3$$

in which C is defined by:

$$C=\{s_k'/(s_1*b)\}^2,$$

in the case where the object distance $s_1$ and the image distance $s_k'$ are both finite and b is the image magnification of the optical element in such state; or by:

$$C=(s_k'/f_{eq})^2,$$

in the case where the object distance $s_1$ is infinite while the image distance $s_k'$ is finite and $f_{eq}$ is the focal length of the optical element; or by:

$$C=(f_{eq}/s_1)^2,$$

in the case where the object distance $s_1$ is finite while the image distance $s_k'$ is infinite and $f_{eq}$ is the focal length of the optical element; or by:

$$C=1/g^2,$$

in the case where the object distance $s_1$ and the image distance $s_k'$ are both infinite and g is the angular magnification of the optical element.

In particular, the present application discloses a configuration in which the optical element includes plural reflective surfaces, containing at least an eccentric reflective surface in which the normal line thereto at the crossing point with the reference axis does not coincide with such reference axis.

Also there is disclosed a configuration in which the light beam from the object is intermediately focused in the interior of the optical element.

Also the entrance surface is a planar, convex or concave surface, and the exit surface is also a planar, convex or concave surface.

According to a second aspect of the present invention, there are provided an optical system and an image taking apparatus comprising an optical element having a convex entrance surface, a curved internal reflective surface and a convex exit surface on the surface of a transparent member:

wherein the light beam from an object is refracted at the entrance surface, thus being incident on the interior of the optical element, then is internally reflected by the reflective surface and refracted at the exit surface, thus emerging from the optical element and focusing on an imaging plane;

a reference axis is defined by the path of a ray emerging from the center of the object, passing through the center of a diaphragm and reaching the center of the imaging plane, and the distance is measured along the reference axis; and wherein parameters A, A', B and B' are defined by:

$$A=(1/r_1-1/s_1)$$

$$A'=(1/r_k-1/s_k')$$

$$B=(1/s_1-1/t_1)$$

$$B'=(1/s_k'-1/t_k')$$

in which $r_1$ is the radius of curvature of the entrance surface, $s_1$ is the distance from the entrance surface to the object, $t_1$ is the distance from the entrance surface to the position of the entrance pupil, $r_k$ is the radius of curvature of the exit surface, $s_k'$ is the distance from the exit surface to the image, and $t_k'$ is the distance from the exit surface to the position of the exit pupil; and the optical element, the object point and the image point are so selected that ratios A/A' and B/B' satisfy the following relations:

$$0.5<(A/A')/C<2.0$$

$$0.3<(B/B')/C<2.3$$

in which C is defined by:

$$C=\{s_k'/(s_1*b)\}^2,$$

in the case where the object distance $s_1$ and the image distance $s_k'$ are both finite and b is the image magnification of the optical element in such state; or by:

$$C=(s_k'/f_{eq})^2,$$

in the case where the object distance $s_1$ is infinite while the image distance $s_k'$ is finite and $f_{eq}$ is the focal length of the optical element; or by:

$$C=(f_{eq}/s_1)^2,$$

in the case where the object distance $s_1$ is finite while the image distance $s_k'$ is infinite and $f_{eq}$ is the focal length of the optical element.

According to a third aspect of the present invention, there are provided an optical system and an image taking apparatus comprising an optical element having a convex entrance surface, a curved internal reflective surface and a substantially planar exit surface on the surface of a transparent member:

wherein the light beam from an object is refracted at the entrance surface, thus being incident on the interior of the optical element, then is internally reflected by the reflective surface and refracted at the exit surface, thus emerging from the optical element and focusing on an imaging plane;

a reference axis is defined by the path of a ray emerging from the center of the object, passing through the center of a diaphragm and reaching the center of the imaging plane, and the distance is measured along the reference axis; and wherein parameters A, A', B and B' are defined by:

$$A=-1/s_1$$

$$A'=(1/r_k-1/s_k')$$

$$B=(1/s_1-1/t_1)$$

$$B'=(1/s_k'-1/t_k')$$

in which $r_1$ is the radius of curvature of the entrance surface, $s_1$ is the distance from the entrance surface to the object, $t_1$ is the distance from the entrance surface to the position of the entrance pupil, $r_k$ is the radius of curvature of the exit surface, $s_k'$ is the distance from the exit surface to the image, and $t_k'$ is the distance from the exit surface to the position of the exit pupil; and the optical element, the object point and the image point are so selected that ratios A/A' and B/B' satisfy the following relations:

$$0.5<(A/A')/C<2.0$$

$$0.3<(B/B')/C<2.3$$

in which C is defined by:

$$C=\{s_k'/(s_1*b)\}^2,$$

in the case where the object distance $s_1$ and the image distance $s_k'$ are both finite and b is the image magnification of the optical element in such state; or by:

$$C=(s_k'/f_{eq})^2,$$

in the case where the object distance $s_1$ is infinite while the image distance $s_k'$ is finite and $f_{eq}$ is the focal length of the optical element; or by:

$$C=(f_{eq}/s_1)^2,$$

in the case where the object distance $s_1$ is finite while the image distance $s_k'$ is infinite and $f_{eq}$ is the focal length of the optical element.

According to a fourth aspect of the present invention, there are provided an optical system and an image taking apparatus comprising an optical element having a convex entrance surface, a curved internal reflective surface and a concave exit surface on the surface of a transparent member:

wherein the light beam from an object is refracted at the entrance surface, thus being incident on the interior of the optical element, then is internally reflected by the reflective surface and refracted at the exit surface, thus emerging from the optical element and focusing on an imaging plane;

a reference axis is defined by the path of a ray emerging from the center of the object, passing through the center of a diaphragm and reaching the center of the imaging plane, and the distance is measured along the reference axis; and wherein parameters A, A', B and B' are defined by:

$$A=(1/r_1-1/s_1)$$

$$A'=(1/r_k-1/s_k')$$

$$B-(1/s_1-1/t_1)$$

$$B'=(1/s_k'-1/t_k')$$

in which $r_1$ is the radius of curvature of the entrance surface, $s_1$ is the distance from the entrance surface to the object, $t_1$ is the distance from the entrance surface to the position of the entrance pupil, $r_k$ is the radius of curvature of the exit surface, $s_k'$ is the distance from the exit surface to the image, and $t_k'$ is the distance from the exit surface to the position of the exit pupil; and the optical element, the object point and the image point are so selected that ratios A/A' and B/B' satisfy the following relations:

$$0.5 < (A/A')/C < 2.0$$

$$0.3 < (B/B')/C < 2.3$$

in which C is defined by:

$$C = \{s_k'/(s_1 * b)\}^2,$$

in the case where the object distance $s_1$ and the image distance $s_k'$ are both finite and b is the image magnification of the optical element in such state; or by:

$$C = (s_k'/f_{eq})^2,$$

in the case where the object distance $s_1$ is infinite while the image distance $s_k'$ is finite and $f_{eq}$ is the focal length of the optical element; or by:

$$C = (f_{eq}/s_1)^2,$$

in the case where the object distance $s_1$ is finite while the image distance $s_k'$ is infinite and $f_{eq}$ is the focal length of the optical element.

According to a fifth aspect of the present invention, there are provided an optical system and an image taking apparatus comprising an optical element having a substantially planar entrance surface, a curved internal reflective surface and a substantially planar exit surface on the surface of a transparent member:

wherein the light beam from an object is refracted at the entrance surface, thus being incident on the interior of the optical element, then is internally reflected by the reflective surface and refracted at the exit surface, thus emerging from the optical element and focusing on an imaging plane;

a reference axis is defined by the path of a ray emerging from the center of the object, passing through the center of a diaphragm and reaching the center of the imaging plane, and the distance is measured along the reference axis; and wherein parameters A, A', B and B' are defined by:

$$A = -1/s_1$$

$$A' = -1/s_k'$$

$$B = (1/s_1 - 1/t_1)$$

$$B' = (1/s_k' - 1/t_k')$$

in which $r_1$ is the radius of curvature of the entrance surface, $s_1$ is the distance from the entrance surface to the object, $t_1$ is the distance from the entrance surface to the position of the entrance pupil, $r_k$ is the radius of curvature of the exit surface, $s_k'$ is the distance from the exit surface to the image, and $t_k'$ is the distance from the exit surface to the position of the exit pupil; and the optical element, the object point and the image point are so selected that ratios A/A' and B/B' satisfy the following relations:

$$0.5 < (A/A')/C < 2.0$$

$$0.3 < (B/B')/C < 2.3$$

in which C is defined by:

$$C = \{s_k'/(s_1 * b)\}^2,$$

in the case where the object distance $s_1$ and the image distance $s_k'$ are both finite and b is the image magnification of the optical element in such state.

According to a sixth aspect of the present invention, there are provided an optical system and an image taking apparatus comprising an optical element having a substantially planar entrance surface, a curved internal reflective surface and a concave exit surface on the surface of a transparent member;

wherein the light beam from an object is refracted at the entrance surface, thus being incident on the interior of the optical element, then is internally reflected by the reflective surface and refracted at the exit surface, thus emerging from the optical element and focusing on an imaging plane;

a reference axis is defined by the path of a ray emerging from the center of the object, passing through the center of a diaphragm and reaching the center of the imaging plane, and the distance is measured along the reference axis; and wherein parameters A, A', B and B' are defined by:

$$A = (1/r_1 - 1/s_1)$$

$$A' = (1/r_k - 1/s_k')$$

$$B = (1/s_1 - 1/t_1)$$

$$B' = (1/s_k - 1/t_k')$$

in which $r_1$ is the radius of curvature of the entrance surface, $s_1$ is the distance from the entrance surface to the object, $t_1$ is the distance from the entrance surface to the position of the entrance pupil, $r_k$ is the radius of curvature of the exit surface, $s_k'$ is the distance from the exit surface to the image, and $t_k'$ is the distance from the exit surface to the position of the exit pupil; and the optical element, the object point and the image point are so selected that ratios A/A' and B/B' satisfy the following relations:

$$0.5 < (A/A')/C < 2.0$$

$$0.3 < (B/B')/C < 2.3$$

in which C is defined by:

$$C = \{s_k'/(s_1 * b)\}^2,$$

in the case where the object distance $s_1$ and the image distance $s_k'$, are both finite and b is the image magnification of the optical element in such state; or by:

$$C = (f_{eq}/s_1)^2,$$

in the case where the object distance $s_1$ is finite while the image distance $s_k'$ is infinite and $f_{eq}$ is the focal length of the optical element.

According to a seventh aspect of the present invention, there are provided an optical system and an image taking apparatus comprising an optical element having a concave entrance surface, a curved internal reflective surface and a concave exit surface on the surface of a transparent member:

wherein the light beam from an object is refracted at the entrance surface, thus being incident on the interior of the optical element, then is internally reflected by the reflective surface and refracted at the exit surface, thus emerging from the optical element and focusing on an imaging plane;

a reference axis is defined by the path of a ray emerging from the center of the object, passing through the center of a diaphragm and reaching the center of the imaging plane, and the distance is measured along the reference axis; and wherein parameters A, A', B and B' are defined by:

$$A = (1/r_1 - 1/s_1)$$

$$A' = (1/r_k - 1/s_k')$$

$$B = (1/s_1 - 1/t_1)$$

$$B' = (1/s_k' - 1/t_k')$$

in which $r_1$ is the radius of curvature of the entrance surface, $s_1$ is the distance from the entrance surface to the object, $t_1$ is the distance from the entrance surface to the position of the entrance pupil, $r_k$ is the radius of curvature of the exit surface, $s_k'$ is the distance from the exit surface to the image, and $t_k'$ is the distance from the exit surface to the position of the exit pupil; and the optical element, the object point and the image point are so selected that ratios A/A' and B/B' satisfy the following relations:

$$0.5 < (A/A')/C < 2.0$$

$$0.3 < (B/B')/C < 2.3$$

in which C is defined by:

$$C = \{s_k'/(s_1 * b)\}^2,$$

in the case where the object distance $s_1$ and the image distance $s_k'$ are both finite and b is the image magnification of the optical element in such state; or by:

$$C = (s_k'/f_{eq})^2,$$

in the case where the object distance $s_1$ is infinite while the image distance $s_k'$ is finite and $f_{eq}$ is the focal length of the optical element; or by:

$$C = (f_{eq}/s_1)^2,$$

in case the object distance $s_1$ is finite while the image distance $s_k'$ is infinite and $f_{eq}$ is the focal length of the optical element.

Also the foregoing second to seventh aspects include a configuration in which the optical element includes plural reflective surfaces, containing at least an eccentric reflective surface in which the normal line thereto at the crossing point with the reference axis does not coincide with such reference axis, and a configuration in which the light beam from the object is intermediately focused in the interior of the optical element.

According to an eighth aspect of the present invention, there are provided an optical system and an image taking apparatus comprising an optical element having a convex entrance surface, a curved internal reflective surface and a concave exit surface on the surface of a transparent member:

wherein the light beam from an object is refracted at the entrance surface, thus being incident on the interior of the optical element, then is internally reflected by the reflective surface and refracted at the exit surface, thus emerging from the optical element and focusing on an imaging plane;

a reference axis is defined by the path of a ray emerging from the center of the object, passing through the center of a diaphragm and reaching the center of the imaging plane, and the distance is measured along the reference axis; and wherein the radius $r_1$ of curvature of the entrance surface and the radius $r_k$ of curvature of the exit surface satisfy the following relation:

$$|r_1| > |r_k|$$

In particular, the present application discloses a configuration in which the optical element includes plural reflective surfaces, containing at least an eccentric reflective surface in which the normal line thereto at the crossing point with the reference axis does not coincide with such reference axis, and a configuration in which the light beam from the object is intermediately focused in the interior of the optical element.

In this eighth aspect, by defining parameters A, A' B and B' by:

$$A = (1/r_1 - 1/s_1)$$

$$A' = (1/r_k - 1/s_k')$$

$$B = (1/s_1 - 1/t_1)$$

$$B' = (1/s_k' - 1/t_k')$$

in which $s_1$ is the distance from the entrance surface to the object, $t_1$ is the distance from the entrance surface to the position of the entrance pupil, $s_k'$ is the distance from the exit surface to the image, and $t_k'$ is the distance from the exit surface to the position of the exit pupil, it is preferable to select the optical element, the object point and the image point in such a manner that ratios A/A' and B/B' satisfy the following relations:

$$0.5 < (A/A')/C < 2.0$$

$$0.3 < (B/B')/C < 2.3$$

in which C is defined by:

$$C = \{s_k'/(s_1 * b)\}^2,$$

in the case where the object distance $s_1$ and the image distance $s_k'$ are both finite and b is the image magnification of the optical element in such state; or by:

$$C = (s_k'/f_{eq})^2,$$

in the case where the object distance $s_1$ is infinite while the image distance $s_k'$ is finite and $f_{eq}$ is the focal length of the optical element; or by:

$$C = (f_{eq}/s_1)^2,$$

in the case where the object distance $s_1$ is finite while the image distance $s_k'$ is infinite and $f_{eq}$ is the focal length of the optical element.

According to a ninth aspect of the present invention, there are provided an optical system and an image taking apparatus comprising an optical element having a convex entrance surface, a curved internal reflective surface and a concave exit surface on the surface of a transparent member:

wherein the light beam from an object is a substantially parallel light beam and is refracted at the entrance surface, thus being incident on the interior of the optical element, then is internally reflected by the reflective surface and refracted at the exit surface, thus emerging from the optical element and focusing on an imaging plane;

a reference axis is defined by the path of a ray emerging from the center of the object, passing through the center of a diaphragm and reaching the center of the imaging plane, and the distance is measured along the reference axis; and wherein the radius $r_1$ of the curvature of the entrance surface, the radius $r_k$ of curvature of the exit surface and the angular magnification g of the optical element satisfy the following relation:

|g|>1

|$r_1$|>|$r_k$|

According to a tenth aspect of the present invention, there are provided an optical system and an image taking apparatus comprising an optical element having a convex entrance surface, a curved internal reflective surface and a concave exit surface on the surface of a transparent member:

wherein the light beam from an object is a substantially parallel light beam and is refracted at the entrance surface, thus being incident on the interior of the optical element, then is internally reflected by the reflective surface and refracted at the exit surface, thus emerging from the optical element and focusing on an imaging plane;

a reference axis is defined by the path of a ray emerging from the center of the object, passing through the center of a diaphragm and reaching the center of the imaging plane, and the distance is measured along the reference axis; and wherein the radius $r_1$ of curvature of the entrance surface and the radius $r_k$ of curvature of the exit surface satisfy the following relations:

|g|<1

|$r_1$|<|$r_k$|

Each of the foregoing ninth and tenth aspects includes a configuration in which the optical element, the object point and the image point are so selected as to satisfy the following relations:

$0.5<(r_k/r_1)*g^2<2.0$ $0.3<(t_k'/r_1)*g^2<2.3$ in which $t_1$ is the distance from the entrance surface to the position of the entrance pupil and $t_k'$ is the distance from the exit surface to the position of the exit pupil. There is also included a configuration in which the optical element includes plural reflective surfaces, containing at least an eccentric reflective surface in which the normal line thereto at the crossing point with the reference axis does not coincide with such reference axis, and a configuration in which the light beam from the object is intermediately focused in the interior of the optical element.

Also the optical system of the foregoing first to tenth aspects may include plural optical elements.

Also the image taking apparatus of each of the foregoing aspects may be used for focusing the image of the object on an image taking plane of an image taking medium such as a CCD or a photographic film.

BRIEF DESCRIPTION OF THE DRAWINGS

FIG. 3 is a cross-sectional view of the embodiment 1 of the optical system of the present invention, showing the optical path of a pupil ray;

DETAILED DESCRIPTION OF THE PREFERRED EMBODIMENTS

At first there will be explained the principle of correction of the chromatic aberration in the present invention, in which there is achieved effective correction of the chromatic aberrations generated at the entrance and exit surfaces of a block-shaped optical element composed of a single medium. In the beginning there will at first be considered the chromatic aberration itself.

Figure 5:
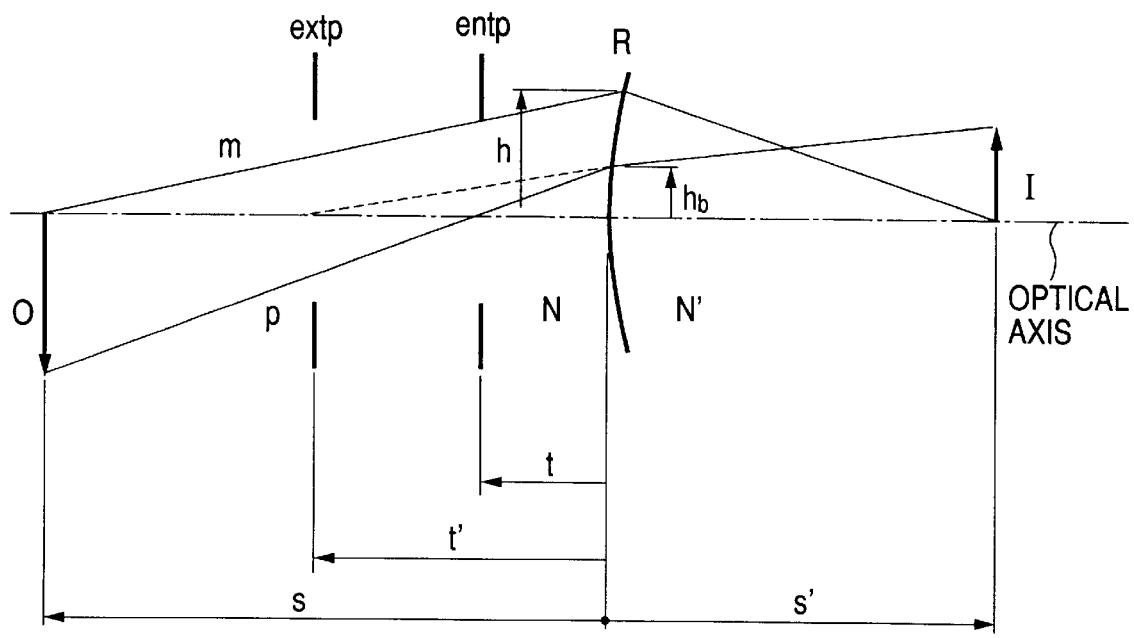
FIG. 5 is a view showing the principle of the present invention at a refracting surface.

The chromatic aberration at a refracting surface will be explained with reference to FIG. 5, wherein R indicates a refracting surface present on an optical axis, represented by a chain line. The entrance pupil entp to this surface is defined at a distance t (entrance pupil distance) from the surface R, and there will be considered the imaging of an object O, at a distance s (object distance) from the surface R, onto an imaging plane I. It is also defined that the image point from the surface R to the object after refraction is at a distance s' (image distance), and that the exit pupil extp is from the surface R to the exit pupil at a distance t' (exit pupil distance). Also the refractive indexes of the media before and after the refractive surface are respectively assumed as N and N'.

At first a paraxial (on-axis) ray m and a paraxial ray (off-axis principal ray) p are traced, and the distances, from the optical axis, of the crossing points of these rays with the surface R are respectively represented by h, $h_b$. It is assumed that the light runs from left to right in the drawing, and the running direction of the light is taken as positive.

Assuming that the surface R is a spherical surface with a radius r of curvature which is the distance from the vertex of the surface to the center of curvature, measured on the optical axis, taking the running direction of light as positive, the chromatic aberration generated at the surface R can be represented, for example according to Yoshiya Matsui, "Lens designing method", by chromatic aberration coefficients L, T which are defined by:

axial chromatic aberration coefficient:

$$L = h \cdot h' \cdot N \cdot (1/r - 1/s) \cdot (dN'/N' - dN/N)$$

lateral chromatic aberration coefficient:

$$T = h \cdot h_b \cdot N \cdot (1/r - 1/t) \cdot (dN'/N' - dN/N) \quad (1)$$

wherein dN, dN' are respectively the deviations between the refractive index at the wavelength employed in the chromatic aberration calculation in the front or rear medium and the refractive index at the reference wavelength. (In the present specification, a symbol · or * indicates multiplication.)

Figure 6:
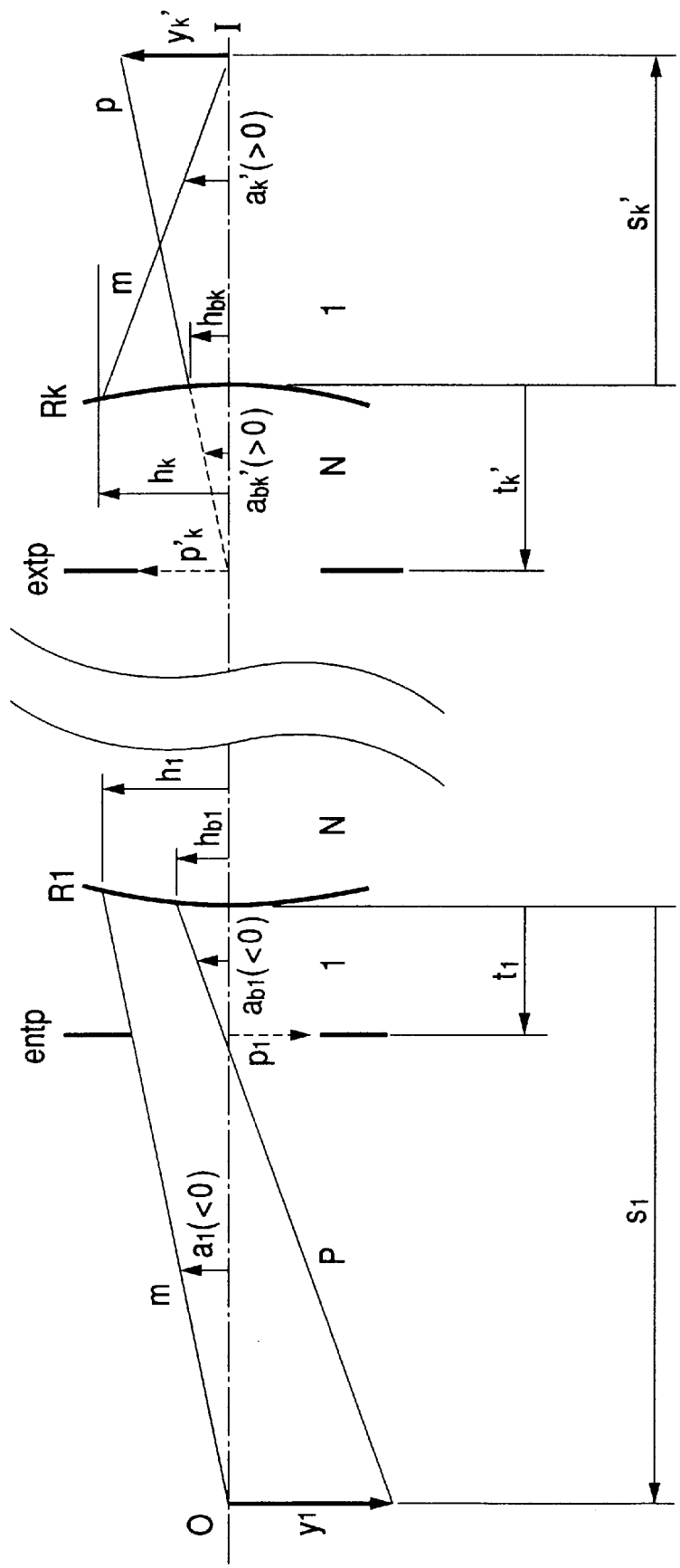
FIG. 6 is a view showing the principle of the present invention in an optical element block composed of two refracting surfaces; .

In the following, there will be considered the chromatic aberration in an optical system composed of two refractive surfaces. FIG. 6 shows the principle of the present invention in an optical element block composed of two refractive surfaces, wherein the optical system is composed of an entrance surface $R_1$ and an exit surface $R_k$ present on an optical axis, represented by a chain line, the space therebetween being filled with a medium of a refractive index N. The medium in front of the entrance surface and that behind the exit surface are assumed to be air.

The entrance pupil entp is defined at a distance $t_1$ (entrance pupil distance) from the surface $R_1$, and it is assumed that a corresponding exit pupil extp is formed at a distance $t_k'$ (exit pupil distance) from the surface $R_k$. There is considered the imaging of an object O at a distance $s_1$ (object distance) from the surface $R_1$. The image I of the object O is formed at a distance $s_k'$ (image distance) from the exit surface $R_k$.

A paraxial ray m (axial ray) and a paraxial ray p (off-axis principal ray) are traced in the following manner. It is assumed that the axial ray m is incident on the surface $R_1$ with angle $a_1$ (<0) and a height $h_1$ and emerges from the surface $R_k$ with angle $a_k'$ (>0) and a height $h_k$, while the off-axis principal ray p is incident on the surface $R_1$ with angle $a_{b1}$ (<0) and a height $h_{b1}$ and emerges from the surface $R_k$ with angle $a_{bk}'$ (>0) and a height $h_{bk}$.

If the surfaces, $R_1$, $R_k$ are spherical surfaces with respective radii 1, k, of curvature, the chromatic aberration coefficients at the entrance and exit surfaces are given by:

$$L = h_1 \cdot h_1 \cdot 1 \cdot (1/r_1 - 1/s_1) \cdot (dN/N - 0) + h_k \cdot h_k \cdot N \cdot (1/r_k - 1/s_k) \cdot (0 - dN/N)$$

$$T = h_1 \cdot h_{b1} \cdot 1 \cdot (1/r_1 - 1/t_1) \cdot (dN/N - 0) + h_k \cdot h_{bk} \cdot N \cdot (1/r_k - 1/t_k) \cdot (0 - dN/N) \quad (2)$$

The object distance $s_k$ and the entrance pupil distance $t_k$ relating to the surface $R_k$ can be correlated, according to Abbe's invariant with the image distance sk and the exit pupil distance $t_k'$ after refraction as follows:

$$N \cdot (1/r_k - 1/s_k) = 1 \cdot (1/r_k - 1/s_k')$$

$$N \cdot (1/r_k - 1/t_k) = 1 \cdot (1/r_k - 1/t_k')$$

These relations are substituted in the equations (2) to obtain:

$$L = \{h_1 \cdot h_1 \cdot (1/r_1 - 1/s_1) - h_k \cdot h_k (1/r_k - 1/s_k')\} \cdot dN/N$$

$$T = \{h_1 \cdot h_{b1} \cdot (1/r_1 - 1/t_1) - h_k \cdot h_{bk}(1/r_k - 1/t_k')\} \cdot dN/N$$

which can be further modified as:

$$L = h_1 \cdot h_1 \{(1/r_1 - 1/s_1) - (h_k/h_1) \cdot (h_k/h_1) \cdot (1/r_k - 1/s_k')\} \cdot dN/N$$

$$T = h_1 \cdot h_{b1} \{(1/r_1 - 1/t_1) - (h_k/h_1) \cdot (h_{bk}/h_{b1}) \cdot (1/r_k - 1/t_k')\} \cdot dN/N \quad (3)$$

Also, as will be apparent from FIG. 6, there stands a relation:

$$h_k/h_1 = (s_k' \cdot a_k')/(s_1 \cdot a_1) = (s_k'/s_1) \cdot (a_k'/a_1) = s_k'/(s_1 \cdot b) \quad (4)$$

wherein $b = a_1/a_k'$ indicates the imaging magnification.

Furthermore, in consideration of Helmholtz-Lagrange's invariant in the imaging relationship between the two pupils, there stands:

$$(y_1 \cdot p_1)/(s_1 - t_1) = (y_k' \cdot p_k')/(s_k' - t_k')$$

wherein $y_1$ is the size of the object O, $y_k'$ is the size of the image I, $P_1$ and $p_k'$ are radii of the apertures of respectively the entrance pupil and the exit pupil. This equation can be modified as:

$$(y_1/y_k')/(p_1/p_k') = (s_1 - t_1')/(s_k' - t_k')$$

In consideration of relationships $y_1/y_k = 1/b$ and $p_1/p_k = a_{bk}'/a_{b1}$, there is obtained:

$$a_{bk}'/a_{b1} = b \cdot (s_1 - t_1)/(s_k' - t_k)$$

so that:

$$h_{bk}/h_{b1} = (t_k' \cdot a_{bk}')/(t_1 \cdot a_{b1}) = (t_k'/t_1) \cdot (a_{bk}'/a_{b1}) = b \cdot (t_k'/t_1) \cdot (s_1 - t_1)/(s_k' - t_k')$$

$$(h_k/h_1) \cdot (h_{bk}/h_{b1}) = [b \cdot (t_k'/t_1) \cdot (s_1 - t_1)/(s_k' - t_k')] \cdot s_k'/(s_1 \cdot b) = (1/s_1 - 1/t_1)/(1/s_k' - 1/t_k') \quad (5)$$

By substituting the equations (4) and (5) into (3), there are obtained:

$$L = h_1 \cdot h_1 \cdot [(1/r_1 - 1/s_1) - \{s_k'/(s_1 \cdot b)\} \cdot \{s_k'/(s_1 \cdot b)\} \cdot (1/r_k - 1/s_k')] \cdot dN/N$$

$$T = h_1 \cdot h_{b1} \cdot [(1/r_1 - 1/t_1) - (1/s_1 - 1/t_1)/(1/s_k' - 1/t_k') \cdot (1/r_k - 1/t_k')] \cdot dN/N \quad (6)$$

from which there can be determined the aberration coefficients L, T representing the axial and lateral chromatic aberrations, respectively.

If the block-shaped optical element is the first optical element from the object point, the initial values of the ray tracking may be selected as:

$$h_1 = s_1 \cdot b$$

$$h_{b1} = -t_1/[(s_1 - t_1) \cdot b]$$

so that the equations (6) may be represented, in this case, as follows:

$$L = [(s_1 \cdot b)^2 \cdot (1/r_1 - 1/s_1) - (s_k')^2 \cdot (1/r_k - 1/s_k')] \cdot dN/N$$

$$T = [(1/r_1 - 1/t_1)/(1/s_1 - 1/t_1) - (1/r_k - 1/t_k')/(1/s_k - 1/t_k')] \cdot dN/N \quad (7)$$

For reducing the chromatic aberration, L=0 in the equations (6) provides:

$$(1/r_1 - 1/s_1)/(1/r_k - 1/s_k') = [s_k'/(s_1 * b)]^2 \quad (8)$$

while T=0 provides:

$$(1/s_1 - 1/t_1)/(1/s_k' - 1/t_k') = [s_k'/(s_1 * b)]^2 \quad (9)$$

Therefore, for attaining L=T=0, the components can be so selected as to satisfy the equations (8) and (9). More specifically, utilizing parameters:

$$A = (1/r_1 - 1/s_1)$$

$$A' = (1/r_k - 1/s_k')$$

$$B = (1/s_1 - 1/t_1)$$

$$B' = (1/s_k' - 1/t_k')$$

the optical element, the object point and the image point can be so determined as to satisfy the following relationships:

$$A/A' = C \quad (10)$$

$$B/B' = C \quad (11)$$

wherein $C = [s_k'/(s_1 * b)]^2$

In the case where the object is at the infinite distance, there stands:

$$s_1 \cdot b \to f (s_1 \to \infty)$$

wherein f is the equivalent focal length of the optical system, so that there can be used:

$$C = (s_k'/f)^2$$

On the other hand, if the object distance $s_1$ is finite while the image distance $s_k'$ is infinite, there can be used:

$$C = (f/s_1)^2,$$

and, in a so-called afocal system in which the object and the image are both in the infinite distance, there can be used:

$$C = 1/g_2,$$

in which g stands for the angular magnification.

The equations (10) and (11) represent conditions for completely canceling the chromatic aberration generated at the two refracting surfaces, but, in practice, it is enough to bring the ratios:

(A/A')/C (B/B')/C as close to 1 as possible, according to the tolerance for the generated chromatic aberration.

Figure 7:
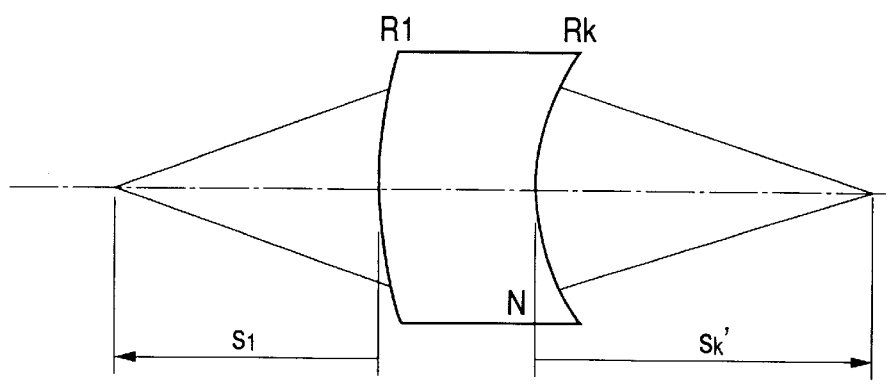
FIG. 7 is a view showing the principle of the present invention in a coaxial system.

In an actual refractive (lens) system, if the object point and the image point are given, the radii $r_1$, $r_k$ of curvature of the front and rear surfaces, the entrance pupil distance $t_1$ and the exit pupil distance $t_k'$ have to be so determined as to satisfy the equations (8) and (9) as shown in FIG. 7.

However, if the refractive surfaces are used for the correction of the chromatic aberration, it becomes difficult to obtain a suitable refractive power in the entire system. For example as shown in FIG. 7 the system becomes a negative lens, so that an imaging system for a finite object distance $S_1$ cannot be obtained. Therefore, in the present invention, there is obtained an imaging system satisfying the foregoing conditions of chromatic aberration correction as shown in FIG. 7, by combining the reflective surfaces and the refractive surfaces, or by employing a so-called catadioptoric system in which a reflective surface with a refractive power is provided between the entrance and exit refractive surfaces. Since the reflective surface does not generate the chromatic aberration in such optical system, the image system can be constructed by an optical element which has an entrance surface, an exit surface and a curved internal reflective surface on the surface of a transparent member.

However, an optical system having the reflective surface and the refractive surfaces in the coaxial arrangement cannot achieve effective utilization of the incident light beam, because of the eclipse by the reflective surface. Also such optical system is not suitable for an image taking system requiring a wide field angle, because, for a similar reason, it is difficult to effectively form images of an oblique object. It is also structurally difficult to utilize two or more reflective surfaces, because sufficient correction of the aberrations, required for the image taking system, is difficult to achieve.

Therefore, according to the present invention, a reflective surface with a refractive power is eccentrically positioned on the surface of the transparent member and the chromatic aberration generated at the entrance and exit surfaces is effectively corrected.

Prior to entering the description of the embodiments, there will be explained the method of representation of parameters thereof and factors common to the following embodiments.

Figure 8:
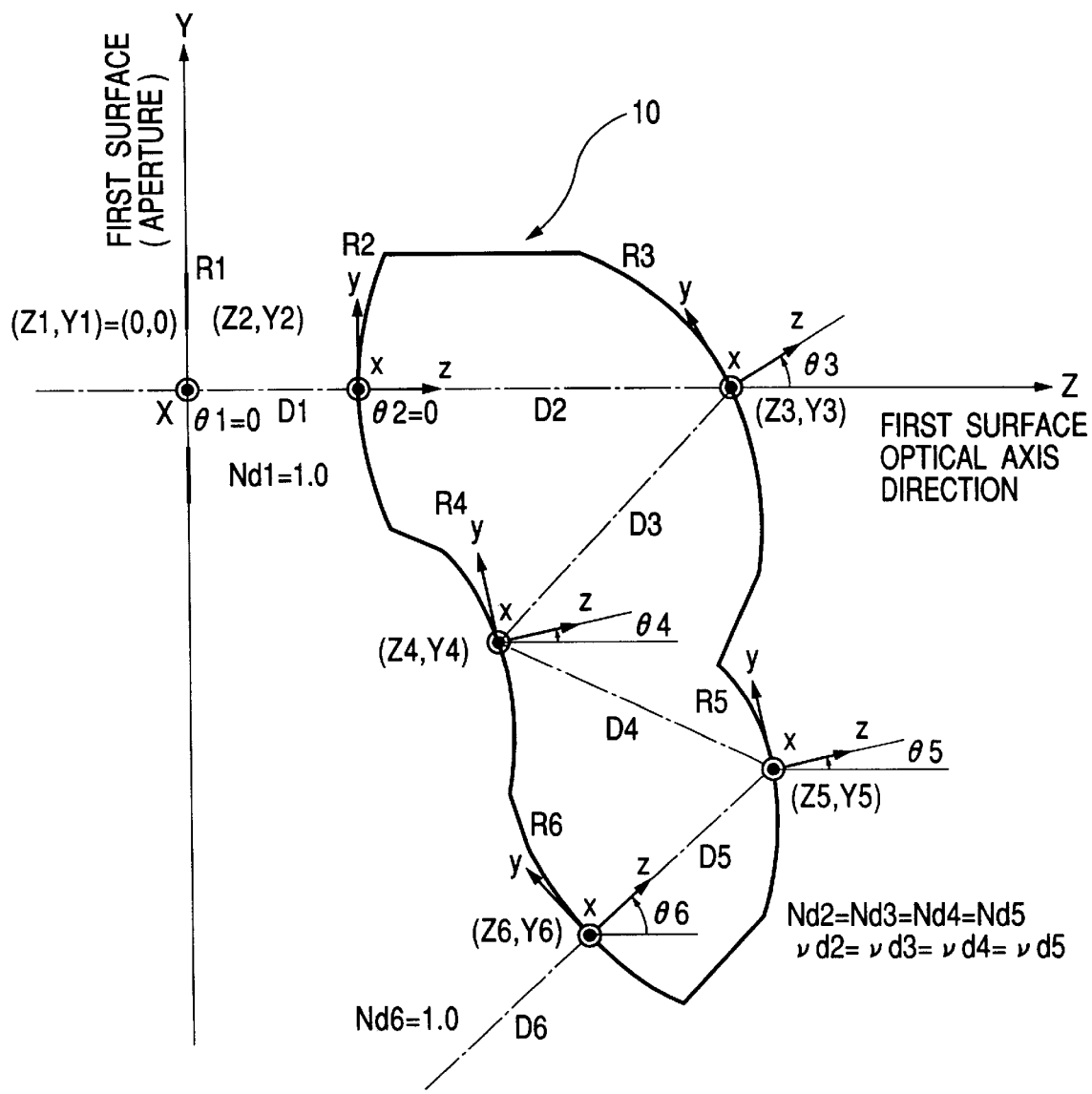
FIG. 8 is a view showing the coordinate system in embodiments of the present invention.

FIG. 8 illustrates a coordinate system for defining the data of the optical system of the present invention. In the embodiments of the present invention, an i-th optical surface along a ray (represented by a chain line in FIG. 8 and called reference axial ray) running -from the object side toward the imaging plane is defined as the i-th surface or surface i.

Referring to FIG. 8, a first surface R1 is a diaphragm; a second surface R2 is a refractive surface coaxial with the first surface; a third surface R3 is a reflective surface tilted with respect to the second surface R2; fourth and fifth surfaces R4, R5 are reflective surfaces respectively shifted and tilted with respect to the preceding surface; and a 6th surface R6 is a refractive surface shifted and tilted with respect to the fifth surface R5. The second to sixth surfaces R2–R6 are formed on a single optical element composed of a medium such as glass or plastics, represented as an optical element 10 in FIG. 8.

In the configuration shown in FIG. 8, the medium from an unrepresented object plane to the second surface R2 is air, the space from the second surface R2 to the sixth surface R6 is composed of a common medium, and the medium from the sixth surface R6 to an unrepresented seventh surface R7 is air.

As the optical system of the present invention is an eccentric optical system, the surfaces constituting the optical system do not have a common optical axis. Consequently, in the embodiments of the present invention, there is defined an absolute coordinate system, having the original point at the center of the effective diameter of the first surface.

In the embodiments of the present invention, the center of the effective diameter of the first surface is taken as the original point, and the path of a ray (reference axial ray) passing through such original point and the center of the final imaging plane is defined as a reference axis of the optical system. Also in these embodiments, the reference axis is given a direction along the running direction of the reference axial ray in the image focusing. When seen from the outside of the optical system, the reference axis can be regarded as being the same as the optical axis in the conventional sense.

Although the reference axis, constituting the reference of the optical system, is defined as explained above in the following embodiments, such reference axis may be arbitrarily determined in consideration of the convenience of optical designing, correction of aberrations or representation of the shapes of the surfaces constituting the optical system. It is however common to take the path of a ray passing through the center of the imaging plane, the center or the diaphragm, entrance pupil, exit pupil or first surface of the optical system, or the center of the final surface as the reference axis constituting the reference of the optical system.

In the embodiments of the present invention, the reference axis is defined as -the path of a ray passing through the center of the optical effective diameter of the first surface or the diaphragm plane, then refracted and/or reflected by the refractive and reflective surfaces and reaching the center of the final imaging plane. The surfaces are numbered according to the order in which the reference axial ray is refracted and/or reflected.

Consequently, the reference axis varies its direction according to the order of the surfaces and according to the rule of refraction or reflection, and finally reaches the center of the imaging plane.

In the optical systems in the embodiments of the present invention, all the tilted surfaces are basically tilted within a same plane. Such common plane is called the tilt plane, and the axes of the absolute coordinate system are defined in the following manner:

Z-axis: reference axis passing through the original point and going toward the second surface R2;

Y-axis: a line passing through the original point and forming an angle of 90° counterclockwise with respect to the Z-axis in the tilt plane (plane of FIG. 8); and X-axis: a line passing through the original point and perpendicular to the Z- and Y-axes (a line perpendicular to the plane of FIG. 8).

As the shape of the i-th surface constituting the optical system can be more easily understood by a representation in a local coordinate system, having the original point at the crossing point of the reference axis with such i-th surface, rather than by being represented in the absolute coordinate system, the data indicating the shape of each surface are represented, in the following embodiments of the present invention, by such local coordinate system.

Also the tilt angle of the i-th surface in the YZ plane is represented by an angle $\theta i$ (unit in degrees) taken positive in the counterclockwise direction with respect to the Z-axis of the absolute coordinate system. Consequently, in the embodiments of the present invention, the original point of the local coordinate system of each surface is on the YZ plane shown in FIG. 8, and each surface is not eccentric in the XZ or XY plane. Furthermore, the y- and z-axes of the local coordinate system (x, y, z) of the i-th surface is inclined by an angle $\theta i$ with respect to the absolute coordinate system (X, Y, Z) in the YZ plane, and, more specifically they are selected in the following manner:

z-axis: a line passing through the original point of the local coordinate system and forming an angle $\theta i$ counterclockwise with respect to the Z direction in the YZ plane of the absolute coordinate system.

The selection of such z-axis is to always set the local coordinate system of a left-hand system with respect to the global coordinate system, whereby the description of a curved surface need not be changed at the insertion or deletion of a reflective surface;

y-axis: a line passing through the original point of the local coordinate system and forming an angle of 90° counterclockwise with respect to the z direction in the YZ plane; and x-axis: a line passing through the original point of the local coordinate system and perpendicular to the YZ plane.

Also Di is a scaler amount representing the gap between the original points of the local coordinate systems of the i-th and (i+1)th surfaces; and Ndi and vdi are respectively the refractive index and the Abbe's number of the medium between the i-th and (i+1)th surfaces. These symbols are employed for representing the cross-sectional views and the numerical data of the optical system embodying the present invention.

The optical system embodying the present invention includes a spherical surface and a rotationally asymmetrical aspherical surface. The shape of the spherical surface is represented by the radius $r_1$ of curvature, of which sign is taken positive or negative respectively in case the center of curvature is positioned in the positive or negative direction of the z-axis of the local coordinate system.

The spherical surface is represented by the following formula:

$$z=\{(x^2+y^2)/r_1\}/[1+\{1-(x^2+y^2)/r_i^2\}^{1/2}]$$

Also the optical system of the present invention includes at least a rotationally asymmetrical aspherical surface, of which shape is represented by the following formula:

$$z=C_{02}\cdot y^2+C_{20}\cdot x^2+C_{03}\cdot y^3+C_{21}\cdot x^2\cdot y+C_{04}\cdot y^4+C_{22}\cdot x^2\cdot y^2+C_{40}\cdot x^4$$

As this equation only includes even-order terms with respect to x, the curved surface defined by this equation is symmetrical with respect to the yz plane, and becomes also symmetrical with respect to the xz plane in case the following condition is satisfied:

$$C_{03}=C_{21}=0$$

The curved surface becomes rotationally symmetrical if the following conditions are satisfied:

$$C_{02}=C_{20}C_{04}=C_{40}=C_{22}/2$$

It is rotationally asymmetrical if the foregoing conditions are not satisfied.

In the following embodiments, except for embodiment 2, the first surface is a diaphragm as shown in FIG. 8. The horizontal semifield angle us indicates the maximum field angle of the light beam being incident on the diaphragm R1 in the YZ plane shown in FIG. 8, and the vertical semifield angle $u_X$ indicates the maximum field angle of the light beam being incident on the diaphragm R1 in the XZ plane shown in FIG. 8. The diameter of the diaphragm R1 constituting the first surface is represented as the diaphragm diameter, which is related with a relative aperture of the optical system. As the entrance pupil is positioned at the first surface, the diaphragm diameter is equal to the diameter of the entrance pupil.

Also the effective image area on the imaging plane is indicated as the image size, which is represented by a rectangular area, with horizontal and vertical sizes respectively in the y- and x-directions of the local coordinate system.

As all the following embodiments are non-coaxial optical systems, it is difficult to directly calculate the focal length based on the paraxial theory. For this reason, equivalent focal length $f_{eq}$ is defined in the following manner:

$$f_{eq} = h_1/\tan(a_k')$$

wherein:

$h_1$: entering height of a ray being incident on the first plane, parallel to the reference axis and infinitely close thereto; and $a_k'$: angle of the above-mentioned ray to the reference axis at the existing from the final surface.

Now the symbols employed in the present specification are summarized in the following:

$r_1$: radius of curvature of the first surface of the optical system or of the entrance surface of the optical element (distance from the vertex of the surface to the center of curvature);

$s_1$: object distance of the entrance surface (distance from the vertex of the entrance surface to the object);

$t_1$: entrance pupil distance of the entrance surface (distance from the vertex of the entrance surface to the entrance pupil);

$r_k$: radius of curvature of the exit surface of the optical element (distance from the vertex of the exit surface to the center of curvature);

$s_k'$: image distance of the exit surface (distance from the vertex of the exit surface to the image); and $t_k'$: exit pupil distance of the exit surface (distance from the vertex of the exit surface to the exit pupil).

The radius of curvature of the entrance or exit surface of the optical element, or the entrance or exit pupil distance is measured from the vertex of the respective surface, along the reference axis, taking the running direction of light as positive. (In the following data tables, the sign of the radius of curvature may be inverted from the above-mentioned definition according to the definition of the local coordinate system, but, in the analysis according to the conditional equations and in the description of the claims, the radius of curvature and the pupil distance follow the above-mentioned definition.)

Also a convex entrance surface means a surface with a positive radius of curvature, and a convex exit surface means a surface with a negative radius of curvature.

Also in the following embodiments, the conditions for the chromatic aberration correction are represented by the following ratios, between the left-hand side and the right-hand side of the foregoing equations (10) and (11):

$$E = (A/A')/C \quad (14)$$

$$E' = (B/B')/C \quad (15)$$

For each of the embodiments for which the parametric data are given, there is shown a ray aberration plot, showing the ray aberrations of the light beams having horizontal and vertical incident angles of $(u_Y, u_X)$, $(0, u_X)$, $(-u_Y, u_X)$, $(u_Y, 0)$ and $(-u_Y, 0)$ into the diaphragm R1. In the ray aberration plot, the abscissa indicates the entering height into the pupil while the ordinate indicates the amount of aberration. Since each embodiment is basically symmetrical with respect to the yz plane, the vertical field angle becomes also symmetrical in the positive and negative directions in the ray aberration plot, so that, for the purpose of simplicity, the negative portion is omitted.

[Embodiment 1]

Figure 1:
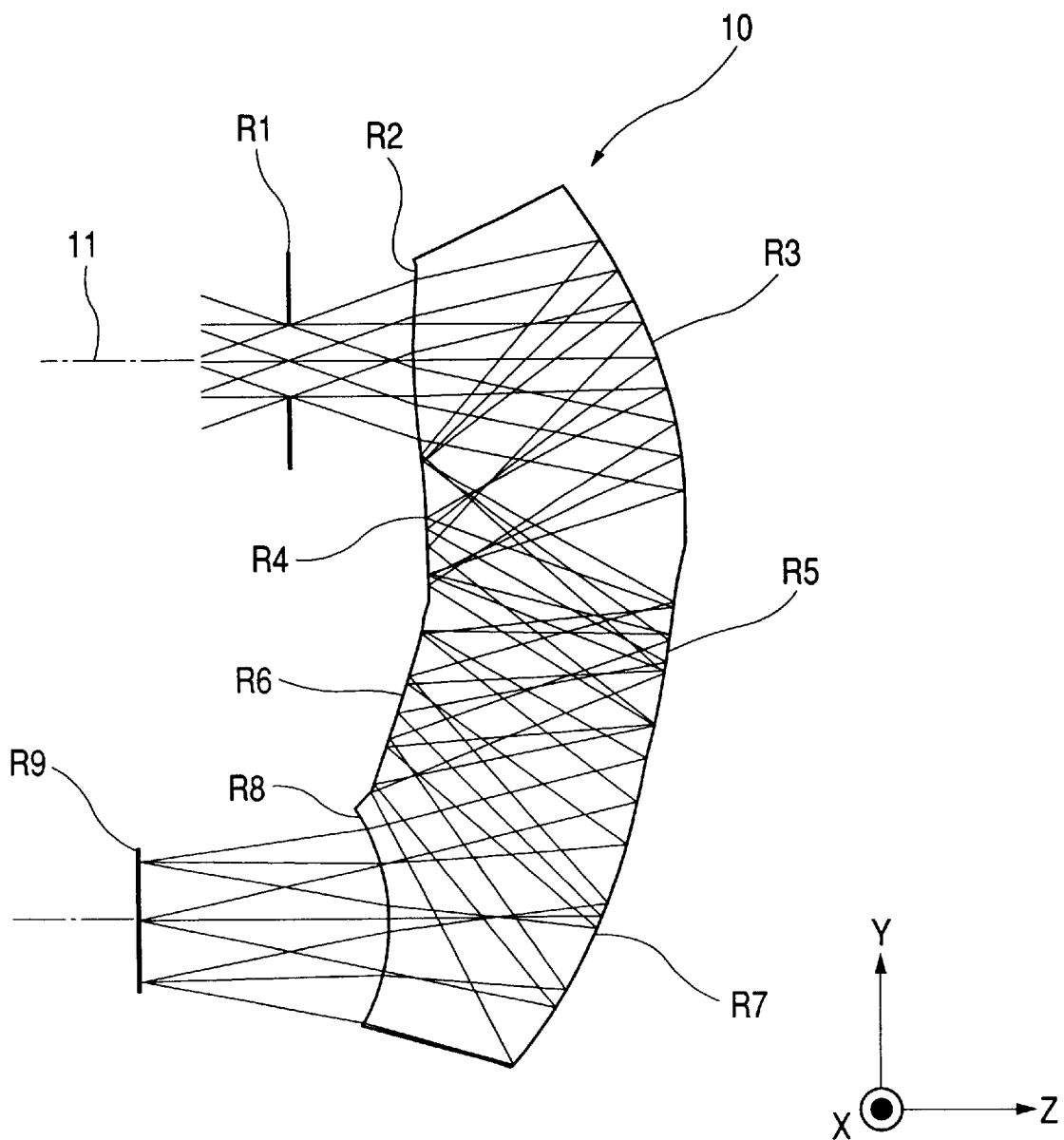
FIG. 1 is a cross-sectional view of an embodiment 1 of the optical system of the present invention.
Figure 2:
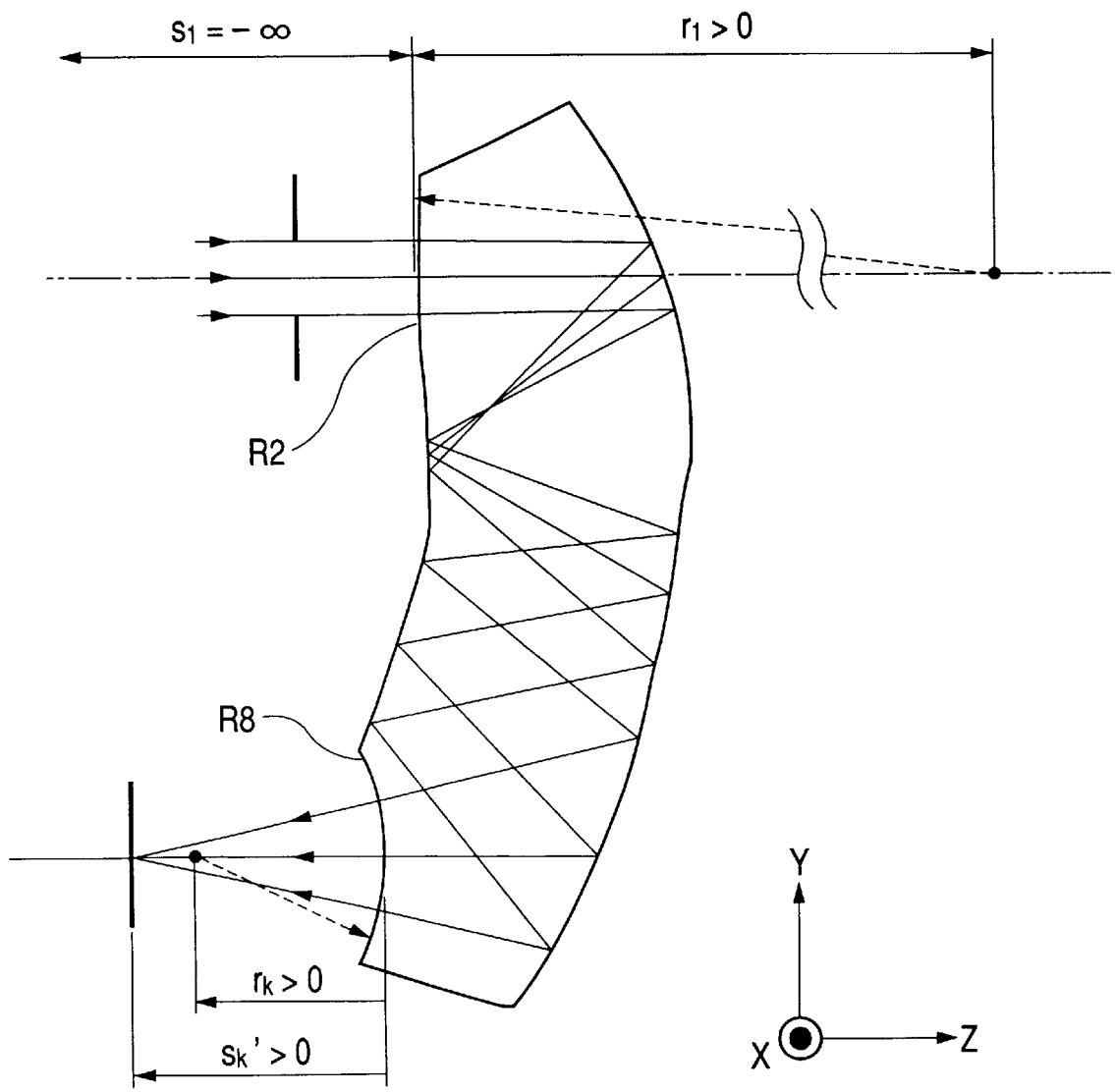
FIG. 2 is a cross-sectional view of the embodiment 1 of the optical system of the present invention, showing the optical path of an axial ray.
Figure 4:
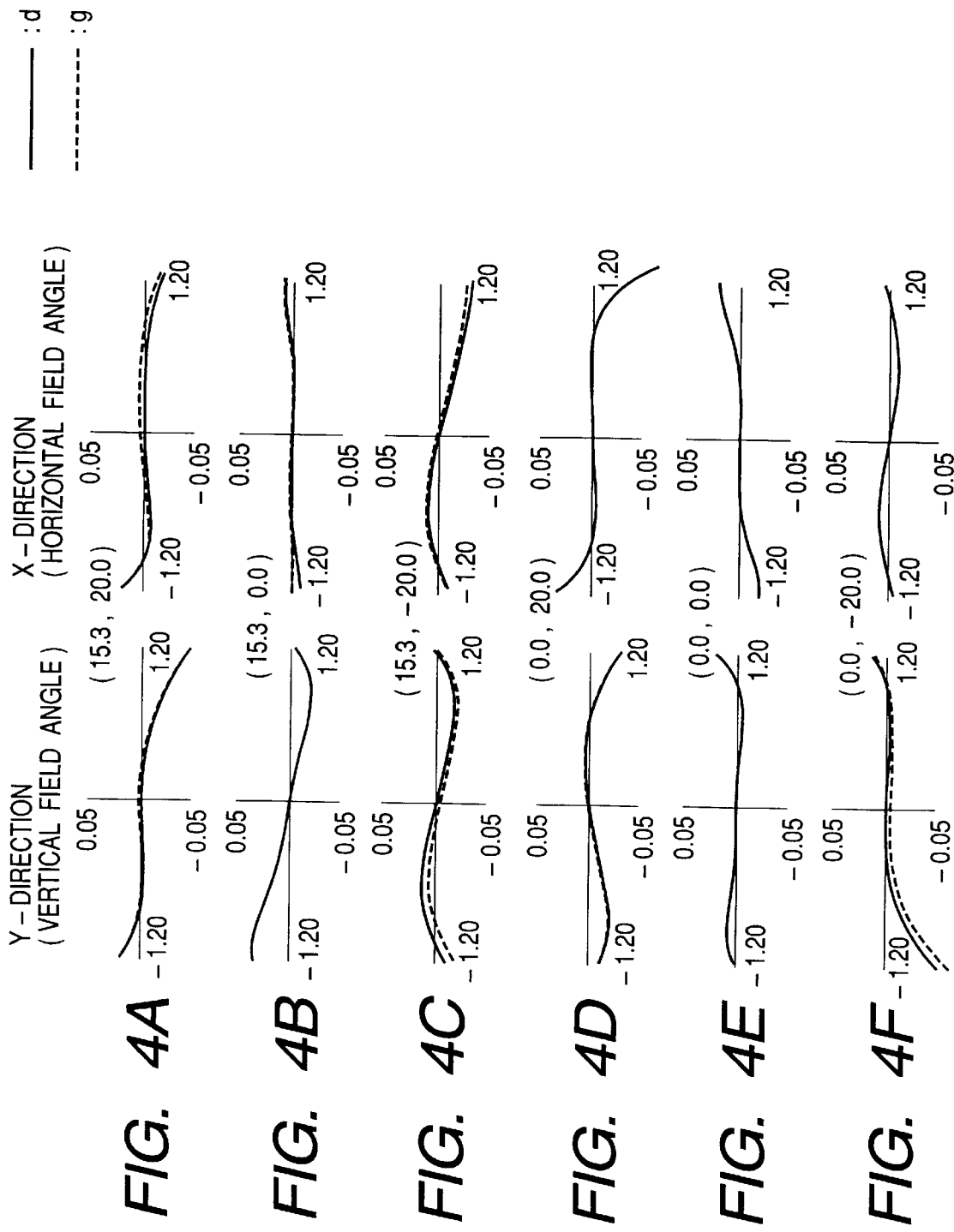
FIGS. 4A, 4B, 4C, 4D, 4E and 4F are charts showing the ray aberrations of the embodiment 1.

FIG. 1 is a cross-sectional view, along the yz plane, of an embodiment 1 of the optical system of the present invention, constituting an image taking optical system with a horizontal field angle of 40.0° and a vertical field angle of 30.6°. FIG. 1 also shows the optical path, while FIG. 2 is also a cross-sectional view, along the YZ plane, of the embodiment 1, showing the paths of axial rays and the related parameters. Also FIG. 3 is a cross-sectional view of the embodiment 1 along the YZ plane, showing the paths of principal rays passing through the center of the diaphragm and the related parameters. The parameters of the present embodiment are shown in the following:

| | |
|---|---|
| horizontal semifield angle: | 20.0 |
| vertical semifield angle: | 15.3 |
| diaphragm diameter: | 2.40 |

| i | Yi | Zi | θi | Di | Ndi | νdi | |
|---|---|---|---|---|---|---|---|
| 1 | 0.00 | 0.00 | 0.00 | 4.00 | 1 | | diaphragm |
| 2 | 0.00 | 4.00 | 0.00 | 8.00 | 1.51633 | 64.15 | refractive surface |
| 3 | 0.00 | 12.00 | 18.00 | 9.50 | 1.51633 | 64.15 | reflective surface |
| 4 | -5.58 | 4.31 | 3.00 | 9.00 | 1.51633 | 64.15 | reflective surface |
| 5 | -10.08 | 12.11 | -10.00 | 9.00 | 1.51633 | 64.15 | reflective surface |
| 6 | -11.65 | 3.25 | -18.00 | 9.50 | 1.51633 | 64.15 | reflective surface |
| 7 | -18.48 | 9.84 | -23.00 | 7.00 | 1.51633 | 64.15 | reflective surface |
| 8 | -18.48 | 2.84 | 0.00 | 8.00 | 1 | | refractive surface |
| 9 | -18.48 | -5.15 | -0.00 | | 1 | | imaging plane | spherical surface

R2  r2 = 30.000
R8  r8 = -7.111 aspherical surface

R3  $C_{02} = -3.07235e\text{-}02$  $C_{20} = -4.01047e\text{-}02$
    $C_{03} = 3.60379e\text{-}04$  $C_{21} = -3.47260e\text{-}04$
    $C_{04} = 7.88064e\text{-}05$  $C_{22} = 1.67875e\text{-}05$  $C_{40} = 1.42693e\text{-}05$
R4  $C_{02} = -7.48080e\text{-}03$  $C_{20} = -7.95634e\text{-}02$
    $C_{03} = 1.90033e\text{-}03$  $C_{21} = -3.76394e\text{-}03$
    $C_{04} = -5.46034e\text{-}05$  $C_{22} = -5.0399te\text{-}04$  $C_{40} = -1.07493e\text{-}03$
R5  $C_{02} = -1.36607e\text{-}02$  $C_{20} = -3.24327e\text{-}02$
    $C_{03} = 9.88479e\text{-}04$  $C_{21} = -7.22159e\text{-}04$
    $C_{04} = -6.84846e\text{-}05$  $C_{22} = -4.42342e\text{-}05$  $C_{40} = -5.82908e\text{-}05$
R6  $C_{02} = -3.70863e\text{-}03$  $C_{20} = -1.77019e\text{-}02$
    $C_{03} = 5.81853e\text{-}04$  $C_{21} = -3.20916e\text{-}03$
    $C_{04} = -1.86040e\text{-}04$  $C_{22} = -1.49515e\text{-}04$  $C_{40} = -1.86615e\text{-}04$
R7  $C_{02} = -2.24609e\text{-}02$  $C_{20} = -2.35731e\text{-}02$
    $C_{03} = 1.99395e\text{-}04$  $C_{21} = -9.50902e\text{-}04$
    $C_{04} = -4.91213e\text{-}05$  $C_{22} = -2.75306e\text{-}05$  $C_{40} = -2.79725e\text{-}05$ Referring to FIG. 1, an optical element 10 with plural curved reflective surfaces is composed of a transparent member such as glass. The optical element 10 is surfacially provided, in the passing order of the light from the object, with a convex refractive surface (entrance surface) R2, five reflective surfaces, namely a concave mirror R3, a reflective surface R4, a concave mirror R5, a reflective surface R6 and a concave mirror R7, and a concave refractive surface (exit surface) R8. A diaphragm (entrance pupil) R1 is provided at the object side of the optical element 10. There are also shown a final imaging plane R9, where there is the image taking surface of an image sensor (image taking medium) such as a CCD, and a reference axis 11 of the optical system.

The two refractive surfaces are both formed as rotationally symmetrical spherical surfaces, in order to satisfy the conditions for the chromatic aberration correction and to enable exact measurement of the reference axis in the preparation and evaluation of the optical system. Also the refractive surfaces formed as rotationally symmetrical surfaces reduce the generation of asymmetrical chromatic aberration. All the reflective surfaces are symmetrical only with respect to the YZ plane.

In the following there will be explained the imaging function of the present embodiment. A light beam from the object is limited in the amount of light by the diaphragm R1, then is incident on the optical element 10 through the entrance surface R2, reflected by the surface R3, once focused between the surfaces R3 and R4, then reflected in succession by the surfaces R4, R5, R6 and R7 and emerges from the exit surface R8, thus being refocused on the final imaging plane R9.

As explained above, the light beam introduced into the optical element through the entrance surface R2 is intermediately focused inside the optical element. This is for forming a thin optical system, by causing the off-axis principal rays emerging from the diaphragm R1 to converge before they spread, thereby suppressing the effective diameters of the first reflective surface R3 and ensuing surfaces when the optical system is designed for a wide field angle.

In the present embodiment, all the reference axes being incident on into and emerging from the optical element are on the plane of the drawing (YZ plane).

Consequently, the optical element 10 functions, by the entrance and exit surfaces and the intermediate plural curved reflective surfaces thereof, as a lens unit having desired optical performances and an imaging function with an equivalent focal length $f_{eq}=-5.477$.

Each of the reflective surfaces constituting the optical element 10 is an eccentric reflective surface in which the normal line to the reference point, which is the crossing point of such reflective surface with the entrance or exit reference axis, does not coincide with the reference axis. The use of such reflective surfaces allows to prevent the eclipse in the conventional mirror optical system and to adopt arbitrary arrangement, thereby providing a compact optical element of an arbitrary shape with improved space efficiency.

Also each of the reflective surfaces is so shaped as to have different refractive powers in the mutually perpendicular planes (yz and xz planes) and to have only one symmetric plane. Such shape is to prevent an eccentric aberration generated by the eccentric positioning of each reflective surface.

The present embodiment has the following effects. In the following description, the entrance surface R2 of the optical element 10 is referred to as the surface 1, while the exit surface (R8) is referred to as the surface k. In the present embodiment, with respect to the object distance $s_1$ (infinite) of the entrance surface and the image distance $s_k'$ of the exit surface as shown in FIGS. 2 and 3, the radius $r_1$ of curvature of the entrance surface, the entrance pupil distance $t_1$, the radius $r_k$ of curvature of the exit surface and the exit pupil distance $t_k'$ are so suitably selected as to satisfy the conditions of the equations (8) and (9), thereby effectively correcting the chromatic aberration generated at the refractive surfaces.

More specifically, as the object distance at the entrance surface is infinite, there stands $1/s_1=0$. On the other hand, the image distance at the exit surface is $s_k'=D8=8.00$. In consideration of these values, there are selected $r_1=30.0, r_k=7.111$, $t_1=-4.00$ and $t_k'=128.16$ to obtain parameters:

$$A=(1/r_1-1/s_1)=1/30.000-0=0.033$$

$$A'=(1/r_k-1/s_k')=1/7.111-1/8.00=0.016$$

$$B=(1/s_1-1/t_1)=0-1/(-4.000)=0.250$$

$$B'=(1/s_k'-1/t_k')=1/8.000-1/128.16=0.117$$

which give mutually identical ratios:

$$A/A'=2.133$$

$$B/B'=2.133$$

each of which coincides with:

$$C=(s_k'/f_{eq})2=2.133$$

Also the values E, E' indicating the level of chromatic aberration correction are 1.000 and 1.000.

In the present embodiment, the entrance surface of the optical element 10 is made convex to provide a positive refractive power, in order to prevent wide spreading principally of the off-axial principal ray that has passed the diaphragm, thereby realizing a compact and thin optical system.

FIGS. 4A to 4F show the ray aberrations in the present embodiment when the object is at an infinite distance. The present embodiment realizes a well balanced correction state of the aberrations, particularly the chromatic aberrations including the axial and magnification chromatic aberrations.

In the present embodiment, the focusing to the object of a short distance is achieved by the displacement of the entire optical system relative to the image taking plane R9 of the image sensor. Particularly in the present embodiment, since the direction of the reference axis being incident on the optical element 10 is parallel but opposite to the direction of the reference axis emerging from the optical element 10, the focusing operation can be achieved, as in the conventional lens system, by moving the entire optical system parallel to the direction of the emerging reference axis (direction of Z-axis).

Now there will be explained the chromatic aberration generated at the focusing operation to an object of a short distance. The aforementioned conditions (8) and (9) for the chromatic aberration correction stand, in a strict sense, only for a specified image point and object point. If the chromatic aberration correction is conducted, particularly in an image taking optical system, corresponding to the object of the infinite distance as in the present embodiment, the focusing operation for the object of a different distance varies $s_1$, $s_k'$ in the equations (8) and (9). However, the conditions for the chromatic aberration correction need only to be satisfied at the infinite distance, because the conditions (8), (9) for the chromatic aberration correction contain both $s_1$ and $s_k'$ so that the variations therein can be canceled.

The present embodiment shows an example of effective correction of the chromatic aberration by satisfying the conditions (10) and (11). In an optical element for imaging at the object distance $s_1=\infty$, since the ratio $(f_{eq}/s_k')^2$ is positive, it is possible to realize a compact and thin optical system by employing a convex entrance surface with a positive refractive power and to simultaneously correct the chromatic aberration by employing a concave exit surface and adopting a condition $|r_1|>|r_k|$.

[Embodiment 2]

Figure 9:
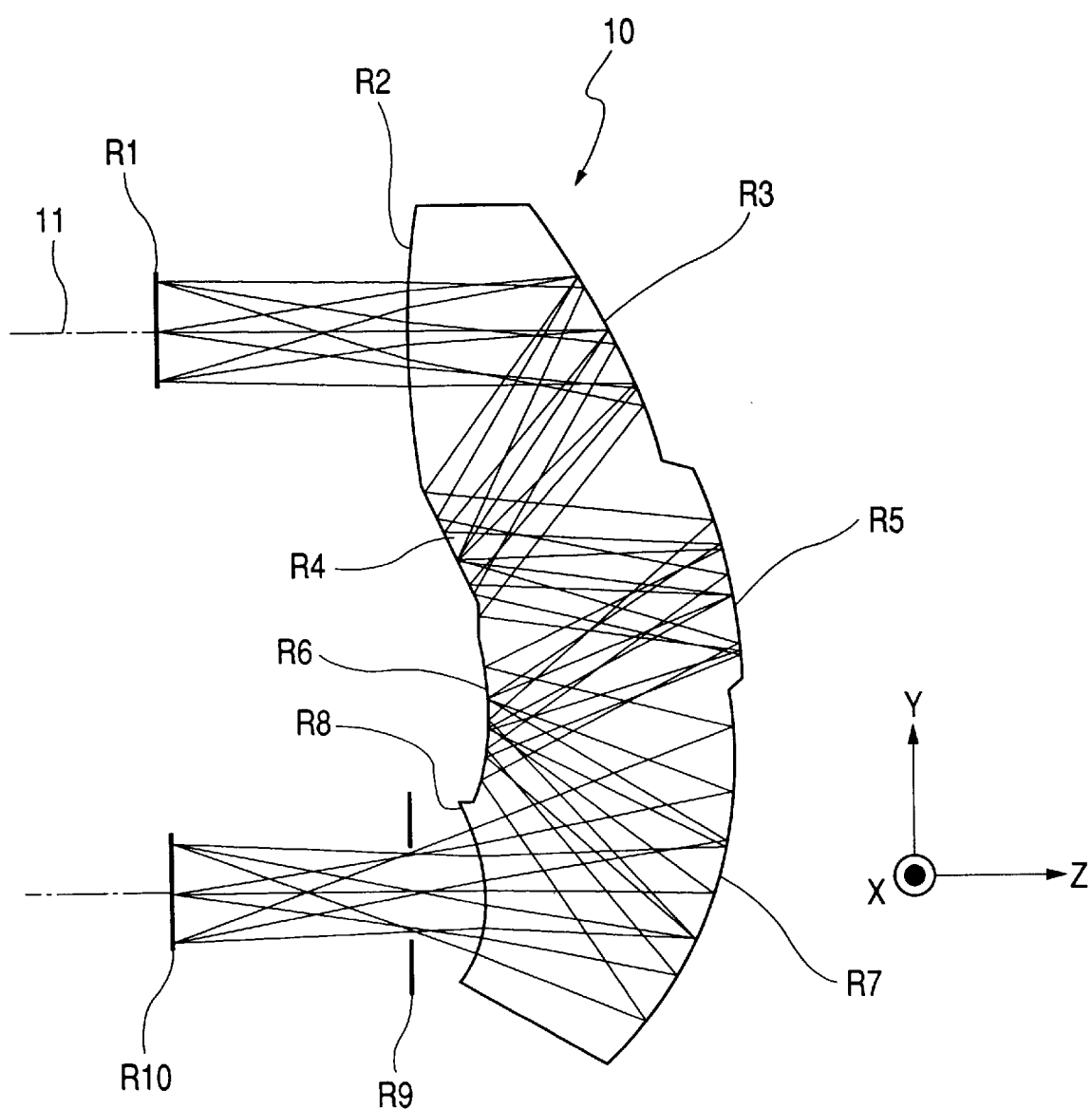
FIG. 9 is a cross-sectional view of an embodiment 2 of the optical system of the present invention.
Figure 10:
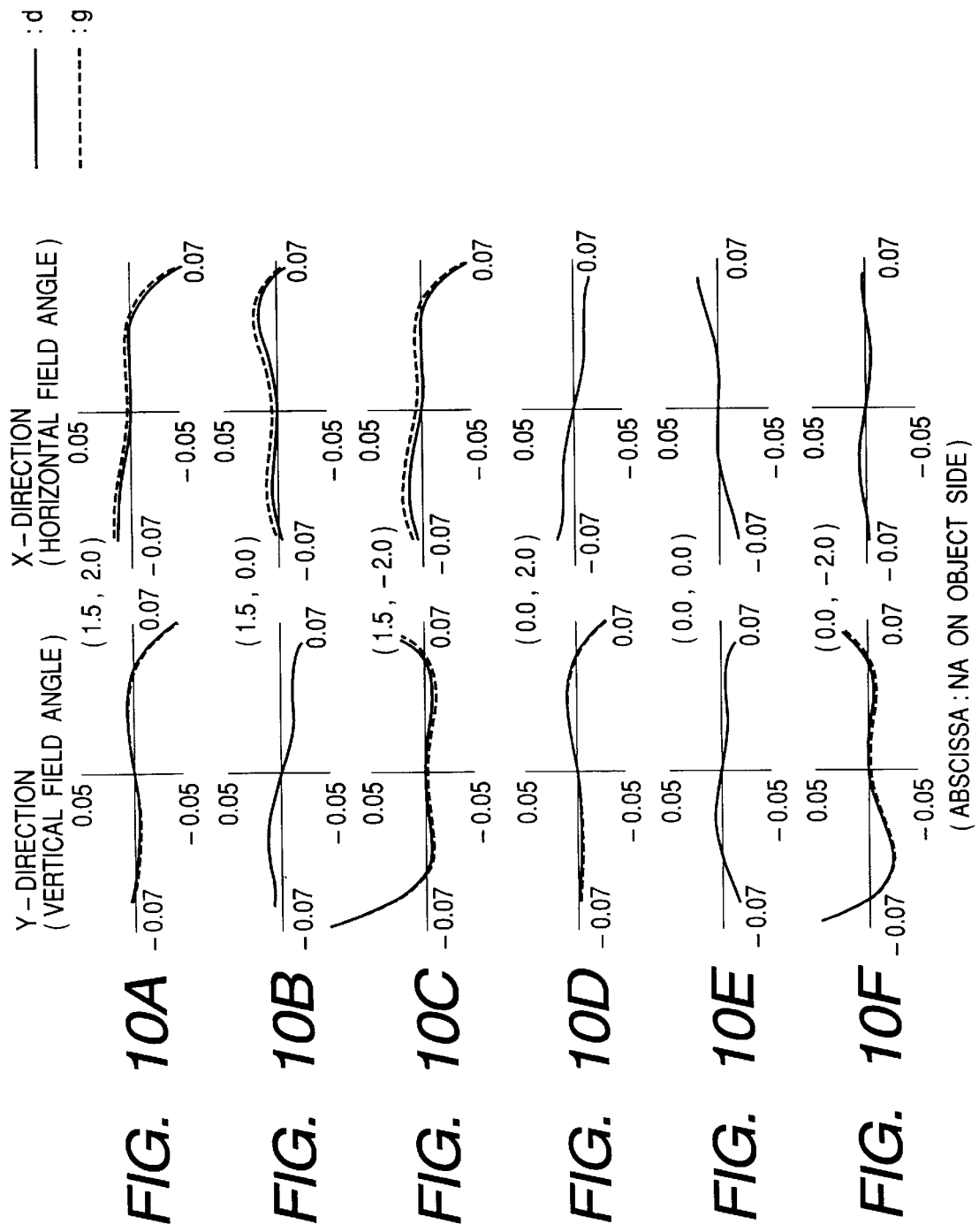
FIGS. 10A, 10B, 10C, 10D, 10E and 10F are charts showing the ray aberrations of the embodiment 2.

FIG. 9 is a cross-sectional view along the YZ plane with optical paths, of an embodiment 2 of the optical system of the present invention, constituting an image taking optical system for forming a same-sized image of an object at a finite distance. The parameters of the present embodiment are shown in the following:

object size: 4 mm horizontal×3 mm vertical object side NA: 0.15 (corresponding to F-number 3.3)

image size: 4 mm horizontal×3 mm vertical

| i | Yi | Zi | θi | Di | Ndi | νdi | |
|---|---|---|---|---|---|---|---|
| 1 | 0.00 | 0.00 | 0.00 | 10.00 | 1 | | object plane |
| 2 | 0.00 | 10.00 | 0.00 | 8.00 | 1.51633 | 64.15 | refractive surface |
| 3 | 0.00 | 18.00 | 28.00 | 11.00 | 1.51633 | 64.15 | reflective surface |
| 4 | −9.12 | 11.85 | 24.00 | 11.00 | 1.51633 | 64.15 | reflective surface |
| 5 | −10.65 | 22.74 | 10.00 | 11.00 | 1.51633 | 64.15 | reflective surface |
| 6 | −15.81 | 13.03 | −4.00 | 11.00 | 1.51633 | 64.15 | reflective surface |
| 7 | −22.28 | 21.93 | −18.00 | 9.00 | 1.51633 | 64.15 | reflective surface |
| 8 | −22.28 | 12.93 | 0.00 | 2.50 | 1 | | refractive surface |
| 9 | −22.28 | 10.43 | 0.00 | 10.06 | 1 | | diaphragm |
| 10 | −22.28 | 0.37 | 0.00 | | 1 | | imaging plane | spherical surface

R2  r2 = 40.000
R8  r8 = −6.278
aspherical surface

R3  $C_{02} = -1.77157\text{e-}02$   $C_{20} = -2.42423\text{e-}02$
    $C_{03} = 6.19375\text{e-}04$    $C_{21} = 9.27124\text{e-}04$
    $C_{04} = 3.29320\text{e-}05$    $C_{22} = 1.20421\text{e-}05$   $C_{40} = 6.05616\text{e-}05$
R4  $C_{02} = -1.40881\text{e-}03$   $C_{20} = -2.12286\text{e-}03$
    $C_{03} = 8.37294\text{e-}04$    $C_{21} = 6.74632\text{e-}04$
    $C_{04} = -3.63413\text{e-}05$   $C_{22} = -7.79873\text{e-}05$  $C_{40} = -4.67059\text{e-}05$ Referring to FIG. 9, an optical element 10 with plural curved reflective surfaces is composed of a transparent member such as glass. The optical element 10 is surfacially provided, in the passing order of the light from the object at the infinite distance, with a convex refractive surface (entrance surface) R2, five reflective surfaces, namely a concave mirror R3, a reflective surface R4, a concave mirror R5, a reflective surface R6 and a concave mirror R7, and a concave refractive surface (exit surface) R8. There are also shown a diaphragm R9, a final imaging plane R10, and a reference axis 11 of the optical system.

The two refractive surfaces are both formed as rotationally symmetrical spherical surfaces, and all the reflective surfaces are symmetrical with respect to the YZ plane.

In the following there will be explained the imaging function of the present embodiment. A light beam from the object R1 is incident on the optical element 10 through the entrance surface R2, then reflected by the surfaces R3 and R4, once focused in the vicinity of the surface R4, then reflected in succession by the surfaces R5, R6 and R7 and emerges from the exit surface R8, further limited in the light amount by the diaphragm R9 and re-focused on the final imaging plane R10.

Consequently, the optical element 10 functions, by the refractive forces of the entrance and exit surfaces and the intermediate plural curved reflective surfaces thereof, as a lens unit having desired optical performances and an imaging function with an equivalent focal length $f_{eq} = -5.746$.

FIGS. 10A to 10F are ray aberration plots of the present embodiment. Only in this embodiment, the abscissa of the ray aberration plots indicate the NA of the object side.

The present embodiment has the following effects. In the following description, the entrance surface R2 of the optical element 10 is referred to as the surface 1, while the exit surface (R8) is referred to as the surface k. In the present embodiment, with respect to the object distance $s_1$ (infinite) of the entrance surface and the image distance $s_k'$ of the exit surface, the radius $r_1$ of curvature of the surface 1, the entrance pupil distance $t_1$, the radius $r_k$ of curvature of the final surface and the exit pupil distance $t_k'$ are so suitably selected as to satisfy the conditions of the equations (8) and (9), thereby effectively correcting the chromatic aberration generated at the refractive surfaces.

More specifically, the object distance is infinite ($s_1 = -10.00$) at the entrance surface, while the image distance at the exit surface is $s_k' = D8 = 12.56$. In consideration of these values, there are selected $r_1 = 40.0$, $r_k = 6.278$, $t_k' = 2.50$ by placing the diaphragm R9 as the exit pupil immediately in front of the imaging plane, and the corresponding entrance pupil distance $t_1 = 128.16$ to obtain parameters:

$$A = (1/r_1 - 1/s_1) = 1/40.000 - 1/(-10.00) = 0.125$$

$$A' = (1/r_k - 1/s_k') = 1/6.278 - 1/12.56 = 0.080$$

$$B = (1/s_1 - 1/t_1) = 1/(-10.00) - 1/3.21 = -0.412$$

$$B' = (1/s_k' - 1/t_k') = 1/12.56 - 1/2.50 = -0.320$$

which provide substantially the same ratios:

$$A/A' = 1.563$$

$$B/B' = 1.284$$

which also coincide with:

$$C = \{s_k'/(s_1 * b)\}2 = 1.578$$

Also the values E, E' indicating the level of chromatic aberration correction are 0.995 and 0.814, respectively.

Also in the present embodiment, the entrance surface of the optical element 10 is made convex to provide a positive refractive power, in order to prevent wide spreading principally of the off-axial principal ray that has passed the diaphragm, thereby realizing a compact and thin optical system.

[Embodiment 3]

Figure 11:
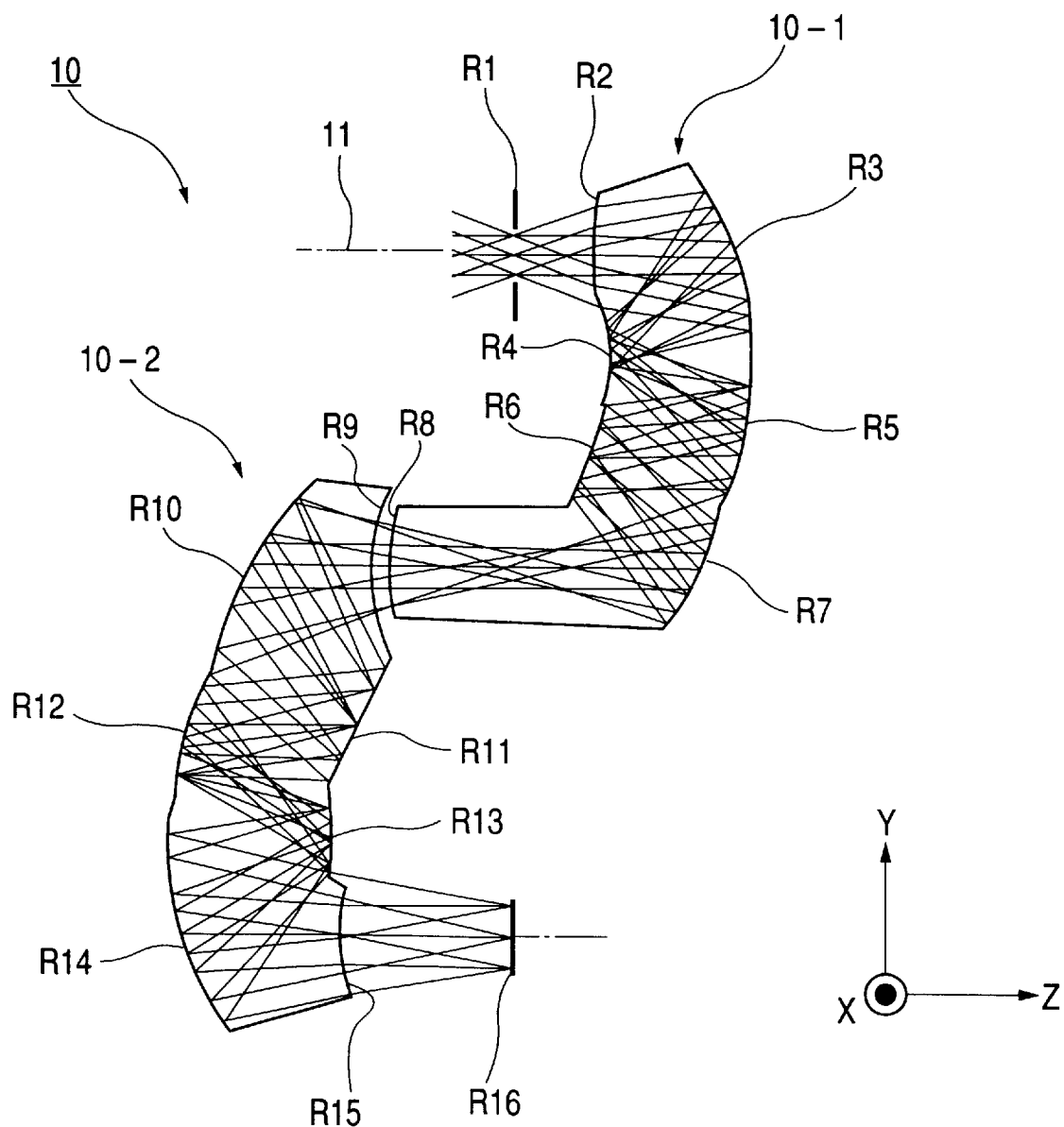
FIG. 11 is a cross-sectional view of an embodiment 3 of the optical system of the present invention.
Figure 12:
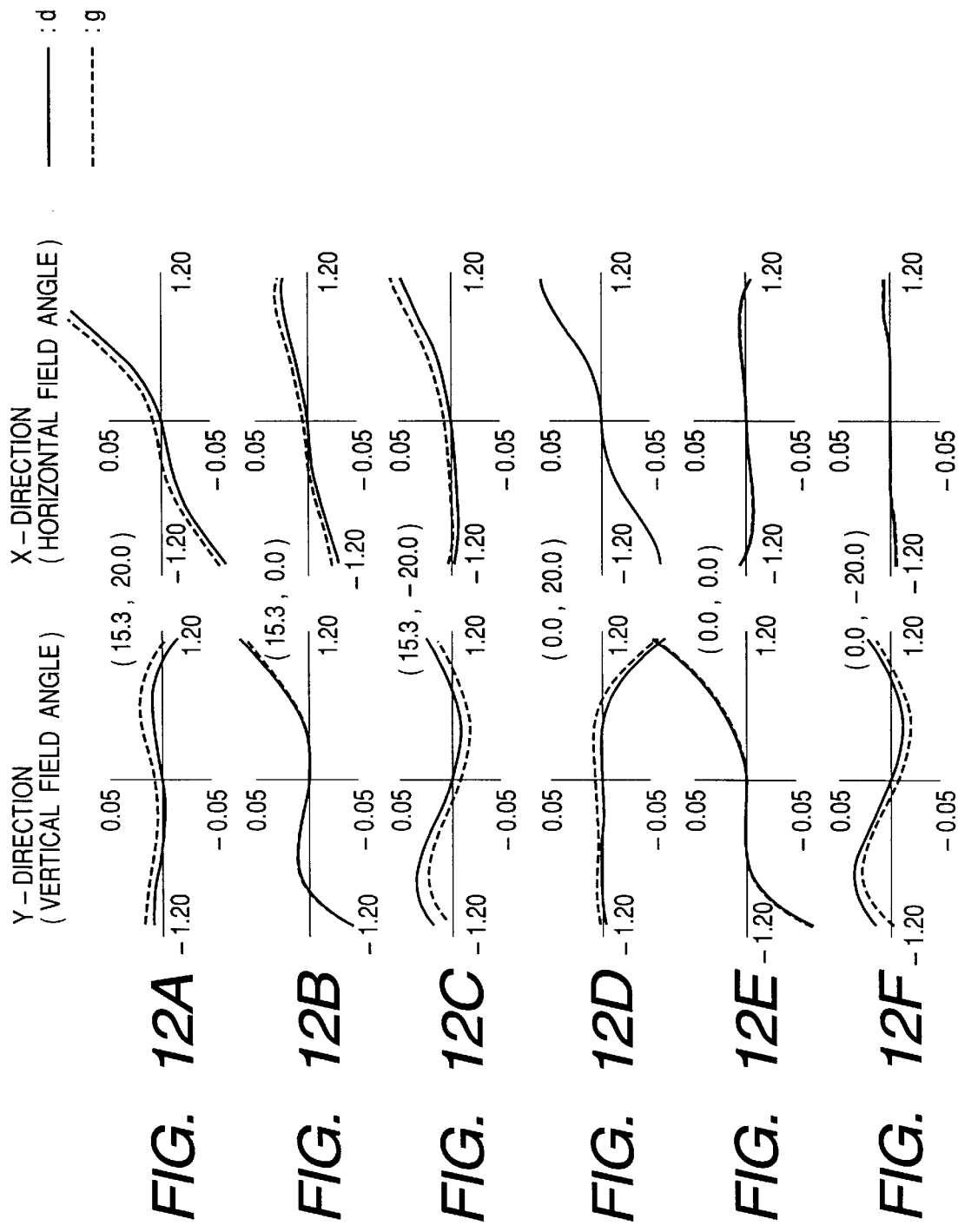
FIGS. 12A, 12B, 12C, 12D, 12E and 12F are charts showing the ray aberrations of the embodiment 3.

FIG. 11 is a cross-sectional view, along the YZ plane, of an embodiment 3 of the optical system of the present invention. The present embodiment is composed of two optical elements 10-1, 10-2 and constitutes an image taking optical system with a horizontal field angle of 40.0° and a vertical field angle of 30.6°. FIG. 11 also shows the optical paths. The parameters of the present embodiment are shown in the following:

horizontal semifield angle: 20.0
vertical semifield angle: 15.3
diaphragm diameter: 2.40

| i | Yi | Zi | θi | Di | Ndi | νdi | |
|---|---|---|---|---|---|---|---|
| 1 | 0.00 | 0.00 | 0.00 | 5.00 | 1 | | diaphragm |
| 2 | 0.00 | 5.00 | 0.00 | 9.00 | 1.51633 | 64.15 | refractive surface |
| 3 | 0.00 | 14.00 | 18.00 | 10.00 | 1.51633 | 64.15 | reflective surface |
| 4 | −5.88 | 5.91 | 3.00 | 10.00 | 1.51633 | 64.15 | reflective surface |
| 5 | −10.88 | 14.57 | −10.00 | 10.00 | 1.51633 | 64.15 | reflective surface |
| 6 | −12.61 | 4.72 | −18.00 | 10.00 | 1.51633 | 64.15 | reflective surface |
| 7 | −19.81 | 11.67 | −23.00 | 19.50 | 1.51633 | 64.15 | reflective surface |
| 8 | −19.81 | −7.83 | 0.00 | 1.11 | 1 | | refractive surface |
| 9 | −19.81 | −8.95 | 0.00 | 7.50 | 1.51633 | 64.15 | refractive surface |
| 10 | −19.81 | −16.45 | −28.00 | 12.00 | 1.51633 | 64.15 | reflective surface |
| 11 | −29.76 | −9.74 | −24.00 | 11.00 | 1.51633 | 64.15 | reflective surface |

-continued

| 12 | −31.29 | −20.63 | −12.00 | 11.00 | 1.51633 | 64.15 | reflective surface |
|----|--------|--------|--------|-------|---------|-------|---------|
| 13 | −37.12 | −11.30 | 0.00 | 11.00 | 1.51633 | 64.15 | reflective surface |
| 14 | −42.95 | −20.63 | 16.00 | 10.00 | 1.51633 | 64.15 | reflective surface |
| 15 | −42.95 | −10.63 | 0.00 | 10.88 | 1 | | refractive surface |
| 16 | −42.95 | 0.25 | −0.00 | | 1 | | imaging plane | spherical surface

R2   r2 = 14.425
R8   r8 = 14.518
R9   r9 = 10.793
R15  r15 = 10.996
aspherical surface

| R3 | $C_{02}$ = −3.36307e-02 | $C_{20}$ = −3.96966e-02 | |
|---|---|---|---|
| | $C_{03}$ = 1.73870e-04 | $C_{21}$ = −2.78524e-04 | |
| | $C_{04}$ = 9.15314e-05 | $C_{22}$ = 5.27811e-05 | $C_{40}$ = 4.63254e-05 |
| R4 | $C_{02}$ = −2.53395e-02 | $C_{20}$ = −5.66253e-02 | |
| | $C_{03}$ = 1.89082e-03 | $C_{21}$ = −6.31225e-04 | |
| | $C_{04}$ = −5.58394e-04 | $C_{22}$ = 2.36501e-05 | $C_{40}$ = −1.84400e-03 |
| R5 | $C_{02}$ = −2.59606e-02 | $C_{20}$ = −3.42937e-02 | |
| | $C_{03}$ = 3.09938e-04 | $C_{21}$ = −4.59074e-05 | |
| | $C_{04}$ = −3.61163e-05 | $C_{22}$ = −3.14942e-05 | $C_{40}$ = −1.81795e-05 |
| R6 | $C_{02}$ = −7.95044e-03 | $C_{20}$ = −1.32857e-02 | |
| | $C_{03}$ = 1.31549e-03 | $C_{21}$ = 2.07240e-04 | |
| | $C_{04}$ = −1.50829e-04 | $C_{22}$ = −1.36362e-04 | $C_{40}$ = 3.75373e-05 |
| R7 | $C_{02}$ = −2.44124e-02 | $C_{20}$ = −1.77231e-02 | |
| | $C_{03}$ = 3.87708e-04 | $C_{21}$ = −5.73749e-04 | |
| | $C_{04}$ = −5.59776e-05 | $C_{22}$ = −5.93448e-05 | $C_{40}$ = 2.03382e-05 |
| R10 | $C_{02}$ = 2.15931e-02 | $C_{20}$ = 2.35600e-02 | |
| | $C_{03}$ = 7.79042e-05 | $C_{21}$ = −1.16213e-03 | |
| | $C_{04}$ = 1.69129e-05 | $C_{22}$ = 1.25783e-04 | $C_{40}$ = 5.57115e-05 |
| R11 | $C_{02}$ = 6.34969e-03 | $C_{20}$ = 1.17460e-02 | |
| | $C_{03}$ = 4.35586e-04 | $C_{21}$ = 2.94999e-03 | |
| | $C_{04}$ = 2.48730e-05 | $C_{22}$ = −6.30440e-05 | $C_{40}$ = −1.95378e-04 |
| R12 | $C_{02}$ = 2.48115e-02 | $C_{20}$ = 3.17807e-02 | |
| | $C_{03}$ = −1.44587e-05 | $C_{21}$ = −4.94898e-04 | |
| | $C_{04}$ = 2.97732e-05 | $C_{22}$ = 5.48106e-05 | $C_{40}$ = 3.13246e-05 |
| R13 | $C_{02}$ = 8.36494e-03 | $C_{20}$ = 1.95099e-02 | |
| | $C_{03}$ = −1.21953e-03 | $C_{21}$ = 8.75201e-04 | |
| | $C_{04}$ = −1.24567e-04 | $C_{22}$ = −6.79298e-05 | $C_{40}$ = 7.44463e-05 |
| R14 | $C_{02}$ = 2.57651e-02 | $C_{20}$ = 3.10676e-02 | |
| | $C_{03}$ = −1.39493e-04 | $C_{21}$ = −1.16931e-03 | |
| | $C_{04}$ = 8.98049e-06 | $C_{22}$ = 5.58685e-06 | $C_{40}$ = 1.84993e-05 |

The present embodiment is composed of two optical elements 10-1, 10-2, each of which is provided with plural curved reflective surfaces and is composed of a transparent member such as glass.

The optical element 10-1 is surfacially provided, in the passing order of the light from the object, with a convex refractive surface (entrance surface) R2, five reflective surfaces, namely a concave mirror R3, a convex mirror R4, a concave mirror R5, a reflective surface R6 and a concave mirror R7, and a convex refractive surface (exit surface) R8.

On the other hand, the optical element 10-2 is surfacially provided, in the passing order of the light from the object, with a concave refractive surface (entrance surface) R9, five reflective surfaces, namely a concave mirror R10, a reflective surface R11, a concave mirror R12, a reflective surface R13 and a concave mirror R14, and a concave refractive surface (exit surface) R15.

There are also shown a diaphragm (entrance pupil) R1, positioned at the object side of the optical element 10-1, a final imaging plane R16 where the image taking surface of an image sensor, such as a CCD, is located, and a reference axis 11 of the optical system.

All the refractive surfaces of the optical elements are formed as rotationally symmetrical spherical surfaces, and all the reflective surfaces are symmetrical with respect to the YZ plane.

In the following there will be explained the imaging function of the present embodiment. A light beam from the object is limited by the diaphragm (entrance pupil) R1, then is incident on the optical element 10-1 through the entrance surface R2, then reflected by the surface R3, once focused in the vicinity of the surface R4, then reflected in succession by the surfaces R4, R5, R6 and R7, again focused between the surfaces R7 and R8, and emerges from the exit surface R8, thus being incident on the second optical element 10-2.

The light beam being incident on the entrance surface R9 of the optical element 10-2 is reflected by the surfaces R10 and R11, then focused in the vicinity of the surface R12, then reflected in succession by the surfaces R12, R13 and R14, and emerges from the exit surface R15, thus being focused on the final imaging plane R16.

In the present embodiment, all the reference axes being incident on into and emerging from the optical element are on the plane of the drawing (YZ plane).

Consequently, the present embodiment, utilizing the combination of two optical elements each having refractive powers at the entrance and exit surfaces and the intermediate plural curved reflective surfaces thereof, functions as a lens unit having desired optical performances and an imaging function with an equivalent focal length $f_{eq}$=−5.428.

FIGS. 12A to 12F are ray aberration plots of the present embodiment. In the present embodiment, there is provided an optical system showing an excellent imaging performance in the entire system by combining two optical elements each having a refractive power. In particular, excellent correction of the chromatic aberration over the entire system is achieved by correcting the chromatic aberration in each optical element.

At first there will be explained the chromatic aberration correction in the optical element 10-1. In the following description, the entrance surface R2 of the optical element 10-1 is referred to as the surface 1, while the exit surface (R8) referred to as the surface k. Since the object distance at the entrance surface of the optical element 10-1 is assumed to be infinite, there stands $1/s_1$=0. On the other hand, the image distance at the exit surface of the optical element 10-1 is $s_k'$=−9.90. In consideration of these values, there are selected $r_1$=14.425, $r_k$=−14.518, and the diaphragm is so designed as to have $t_1$=−5.00 and $t_k'$=−4.57 whereby the optical element 10-1 has the parameters:

$A=(1/r_1-1/s_1)=1/14.425-0=0.069$ $A'=(1/r_k-1/s_k')=-1/14.518-1/(-9.90)=0.032$ $B=(1/s_1-1/t_1)=0-1/(-5.00)=0.200$ $B'=(1/s_k'-1 /t_k')=1/(-9.90)-1/(-4.57)=0.118$ which provide the following ratios:

$A/A'=2.156$ $B/B'=1.699$

Also the value C becomes:

$C=(s_k'/f_{eq})2=4.227$

In this embodiment, the ratios A/A' and B/B' are not so close to C, but the values E, E' indicating the level of chromatic aberration correction are respectively 0.510, 0.402, indicating a practically acceptable level of the chromatic aberration correction.

Also in the optical element 10-1, the entrance surface is made convex to provide a positive refractive power, in order to prevent wide spreading principally of the off-axial principal ray, thereby realizing a compact and thin optical system.

In the following there will be explained the chromatic aberration correction in the optical element 10-2. Also in the following description, the entrance surface R9 of the optical element 10-2 is referred to as the surface 1, while the exit surface (R15) is referred to as the surface k. In the optical element 10-2, effective chromatic aberration correction is realized by employing the results obtained by solving the equations (6) for $r_1$, $r_k$ under the condition L=T=0, and by placing the center of curvature of the entrance surface substantially at the object point and also placing the center of curvature of the exit surface substantially at the image point.

In the present embodiment, as explained in the foregoing, the correction of the chromatic aberration over the entire optical system is achieved by combining two optical elements 10-1, 10-2 each of which is corrected for the chromatic aberration.

[Embodiment 4]

Figure 13:
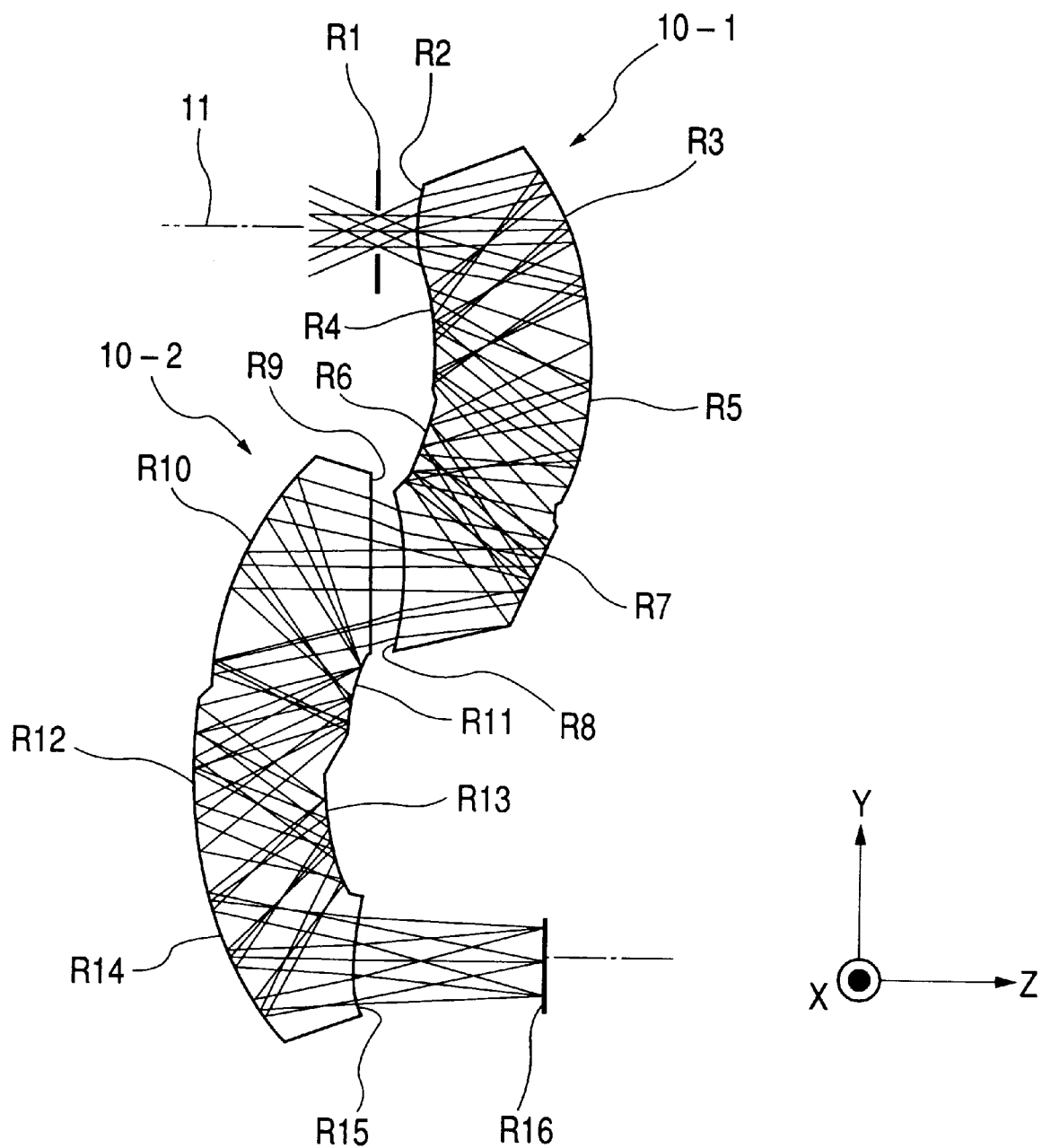
FIG. 13 is a cross-sectional view of an embodiment 4 of the optical system of the present invention.
Figure 14:
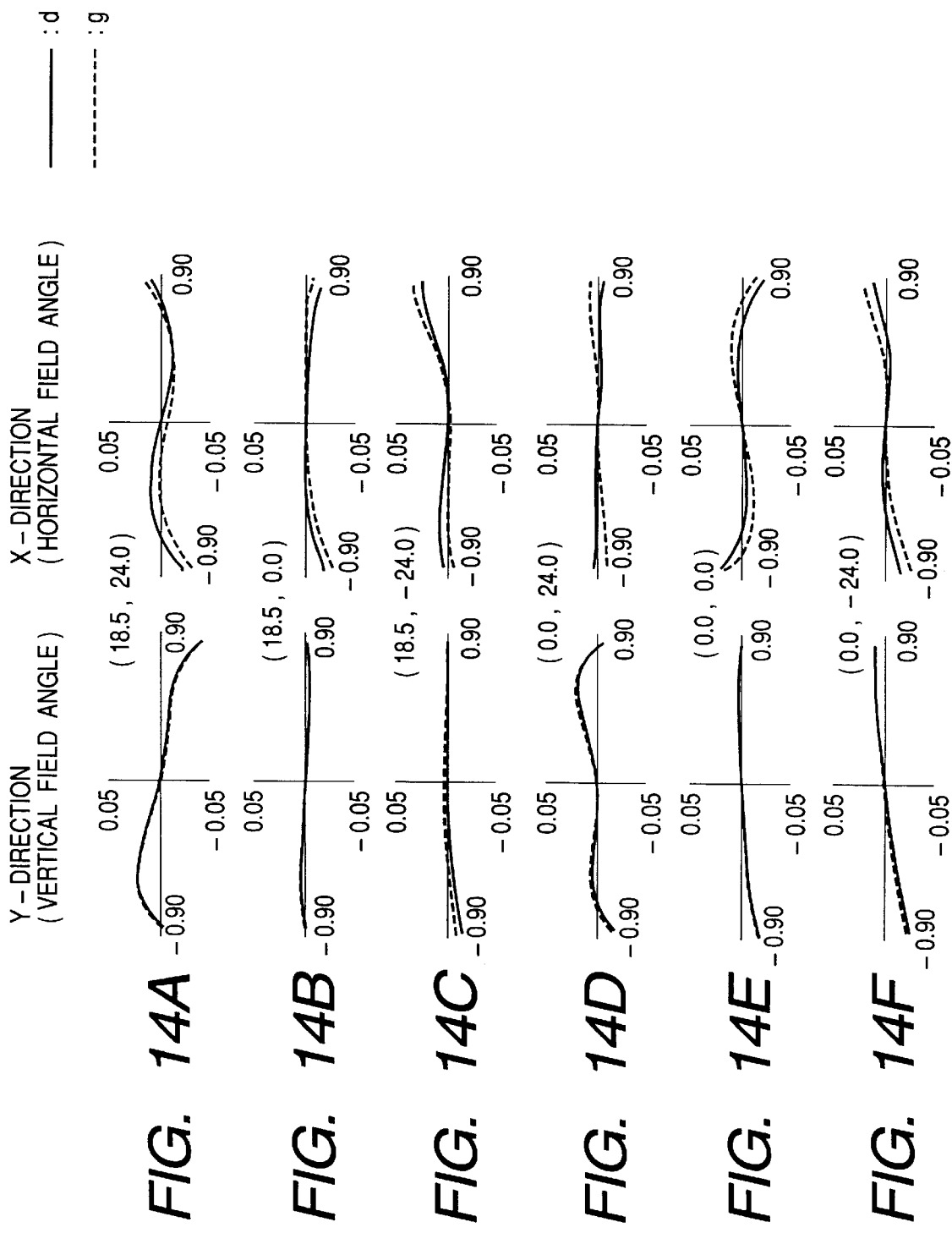
FIGS. 14A, 14B, 14C, 14D, 14E and 14F are charts showing the ray aberrations of the embodiment 4.

FIG. 13 is a cross-sectional view, along the YZ plane, or an embodiment 4 of the optical system of the present invention. The present embodiment is composed of two optical elements 10-1, 10-2 and constitutes an image taking optical system with a horizontal field angle of 48.0° and a vertical field angle of 37.0°. FIG. 13 also shows the optical paths. The parameters of the present embodiment are shown in the following:

horizontal semifield angle: 24.0 vertical semifield angle: 18.5 diaphragm diameter: 1.80 image size: 4 mm horizontal×3 mm vertical

| i | Yi | Zi | θi | Di | Ndi | vdi | |
|---|---|---|---|---|---|---|---|
| 1 | 0.00 | 0.00 | 0.00 | 2.38 | 1 | | diaphragm |
| optical element 10-1 | | | | | | | |
| 2 | 0.00 | 2.38 | 0.00 | 8.50 | 1.51633 | 64.15 | refractive surface |
| 3 | 0.00 | 10.88 | 18.00 | 9.50 | 1.51633 | 64.15 | reflective surface |
| 4 | −5.58 | 3.20 | 3.00 | 10.00 | 1.51633 | 64.15 | reflective surface |
| 5 | −10.58 | 11.86 | −10.00 | 9.50 | 1.51633 | 64.15 | reflective surface |
| 6 | −12.23 | 2.50 | −18.00 | 9.50 | 1.51633 | 64.15 | reflective surface |
| 7 | −19.07 | 9.10 | −23.00 | 7.50 | 1.51633 | 64.15 | reflective surface |
| 8 | −19.07 | 1.60 | 0.00 | 2.00 | 1 | | refractive surface |
| optical element 10-2 | | | | | | | |
| 9 | −19.07 | −0.40 | 0.00 | 7.50 | 1.51633 | 64.15 | refractive surface |
| 10 | −19.07 | −7.90 | −25.00 | 10.00 | 1.51633 | 64.15 | reflective surface |
| 11 | −26.73 | −1.47 | −13.00 | 10.00 | 1.51633 | 64.15 | reflective surface |
| 12 | −30.80 | −10.61 | −1.00 | 9.00 | 1.51633 | 64.15 | reflective surface |
| 13 | −34.74 | −2.52 | 12.00 | 9.00 | 1.51633 | 64.15 | reflective surface |
| 14 | −41.63 | −8.30 | 25.00 | 7.00 | 1.51633 | 64.15 | reflective surface |
| 15 | −41.63 | −1.30 | 0.00 | 10.70 | 1 | | refractive surface |
| 16 | −41.63 | 9.40 | −0.00 | | 1 | | imaging plane |

-continued spherical surface

R2  r2 = 10.000
R8  r8 = 16.000
R9  r9 = ∞
R15 r15 = 10.828 aspherical surface

| | | | |
|---|---|---|---|
| R3 | $C_{02}$ = −3.01088e-02 | $C_{20}$ = −3.92207e-02 | |
| | $C_{03}$ = −8.77711e-04 | $C_{21}$ = −3.72150e-05 | |
| | $C_{04}$ = 4.43535e-05 | $C_{22}$ = 1.83366e-04 | $C_{40}$ = 4.80563e-05 |
| R4 | $C_{02}$ = −2.51157e-02 | $C_{20}$ = −8.32737e-02 | |
| | $C_{03}$ = −4.59825e-04 | $C_{21}$ = −6.22721e-03 | |
| | $C_{04}$ = −2.45070e-04 | $C_{22}$ = 4.36712e-04 | $C_{40}$ = 1.16790e-03 |
| R5 | $C_{02}$ = −2.80333e-02 | $C_{20}$ = −3.06245e-02 | |
| | $C_{03}$ = −3.72242e-05 | $C_{21}$ = −4.24891e-04 | |
| | $C_{04}$ = −4.23710e-05 | $C_{22}$ = −5.92244e-05 | $C_{40}$ = −5.51578e-05 |
| R6 | $C_{02}$ = −1.48552e-02 | $C_{20}$ = −2.04353e-02 | |
| | $C_{03}$ = 1.24936e-03 | $C_{21}$ = −9.05808e-04 | |
| | $C_{04}$ = 2.45679e-05 | $C_{22}$ = 2.59169e-06 | $C_{40}$ = −2.74551e-04 |
| R7 | $C_{02}$ = −4.88571e-03 | $C_{20}$ = −8.04359e-03 | |
| | $C_{03}$ = −1.10894e-04 | $C_{21}$ = −3.55083e-04 | |
| | $C_{04}$ = −2.89639e-06 | $C_{22}$ = −2.05468e-05 | $C_{40}$ = −7.38951e-05 |
| R10 | $C_{02}$ = 2.71153e-02 | $C_{20}$ = 3.80141e-02 | |
| | $C_{03}$ = −1.16366e-04 | $C_{21}$ = −5.39623e-04 | |
| | $C_{04}$ = 2.41034e-05 | $C_{22}$ = 7.23765e-05 | $C_{40}$ = −4.26012e-06 |
| R11 | $C_{02}$ = 6.17509e-02 | $C_{20}$ = −4.36196e-02 | |
| | $C_{03}$ = −8.70369e-03 | $C_{21}$ = 1.40988e-02 | |
| | $C_{04}$ = 3.31665e-04 | $C_{22}$ = −1.76474e-03 | $C_{40}$ = 4.91967e-03 |
| R12 | $C_{02}$ = 2.50508e-02 | $C_{20}$ = 2.74925e-02 | |
| | $C_{03}$ = −3.89646e-04 | $C_{21}$ = 1.13470e-03 | |
| | $C_{04}$ = 3.70800e-06 | $C_{22}$ = 4.78019e-05 | $C_{40}$ = 3.07571e-05 |
| R13 | $C_{02}$ = 2.53809e-02 | $C_{20}$ = 1.68422e-02 | |
| | $C_{03}$ = −8.63259e-04 | $C_{21}$ = 3.50931e-03 | |
| | $C_{04}$ = 1.83136e-04 | $C_{22}$ = 9.44761e-05 | $C_{40}$ = 9.83273e-05 |
| R14 | $C_{02}$ = 2.49102e-02 | $C_{20}$ = 2.10742e-02 | |
| | $C_{03}$ = −5.86896e-05 | $C_{21}$ = 5.93060e-04 | |
| | $C_{04}$ = 2.71619e-05 | $C_{22}$ = 2.13046e-05 | $C_{40}$ = 2.47358e-05 |

The present embodiment is composed of two optical elements 10-1, 10-2, each of which is provided with plural curved reflective surfaces and is composed of a transparent member such as glass.

The optical element 10-1 is surfacially provided, in the passing order of the light from the object, with a convex refractive surface (entrance surface) R2, five reflective surfaces, namely a concave mirror R3, a convex reflective surface R4, a concave mirror R5, a convex reflective surface R6 and a concave mirror R7, and a weak concave refractive surface (exit surface) R8.

On the other hand, the optical element 10-2 is surfacially provided, in the passing order of the light from the object, with a flat refractive surface (entrance surface) R9, five reflective surfaces, namely a concave mirror R10, a reflective surface R11, a concave mirror R12, a convex mirror R13 and a concave mirror R14, and a concave refractive surface (exit surface) R15.

There are also shown a diaphragm (entrance pupil) R1, positioned at the object side of the optical element 10-1, a final imaging plane R16 where the image taking surface of an image sensor, such as a CCD, is located, and a reference axis 11 of the optical system.

All the refractive surfaces of the optical elements are formed as rotationally symmetrical spherical surfaces, and all the reflective surfaces are symmetrical only with respect to the YZ plane.

In the following there will be explained the imaging function of the present embodiment. A light beam from the object is limited by the diaphragm (entrance pupil) R1, then is incident on the optical element 10-1 through the entrance surface R2, then reflected by the surface R3, once focused in the vicinity of the surface R4, then reflected in succession by the surfaces R4, R5, R6 and R7, and emerges from the exit surface R8, thus being incident on the second optical element 10-2.

The light beam being incident on the entrance surface R9 of the optical element 10-2 is reflected by the surface R10, then focused between the surfaces R10 and R11, then reflected in succession by the surfaces R11 and R12, once focused in the vicinity of the surface R13, then reflected in succession by the surfaces R13 and R14, and emerges from the exit surface R15, thus being focused on the final imaging plane R16.

Consequently, the present embodiment, utilizing the combination of two optical elements each having a desired optical performance by the refractive powers at the entrance and exit surfaces and the intermediate plural curved reflective surfaces thereof, functions as a lens unit having an imaging function with an equivalent focal length $f_{eq}=4.493$.

FIGS. 14A to 14F are ray aberration plots of the present embodiment.

At first there will be explained the chromatic aberration correction in the optical element 10-1. In the following description, the entrance surface R2 of the optical element 10-1 is referred to as the surface 1, while the exit surface (R8) is referred to as the surface k. In the present embodiment, the optical element 10-1 constitutes a substantially afocal system, and serves as a so-called wide converter for expanding the field angle of the optical element 10-2 by about 1.2 times. In the case where an afocal system is used in the vicinity of the infinite object distance, the object distance $s_1$ of the entrance surface and the image distance $s_k$ of the exit surface are both infinite, so that $1/s_1 = 1/s_k' = 0$ in the optical element 10-1. In consideration of these values, there are selected $r_1 = 10.000$ and $r_k = 16.000$, and the diaphragm is so designed as to have $t_1 = -2.38$ and $t_k' = -8.43$. Also the optical element 10-1 constituting the afocal converter singly has an angular magnification $g = -0.802$. Consequently the optical element 10-1 has the following parameters:

$$A = (1/r_1 - 1/s_1) = 1/10.000 - 0 = 0.100$$

$$A' = (1/r_k - 1/s_k') = 1/16.000 - 0 = 0.063$$

$$B = (1/s_1 - 1/t_1) = 0 - 1/(-2.38) = 0.420$$

$$B' = (1/s_k' - 1/t_k') = 0 - 1/(-8.43) = 0.119$$

which provide the following ratios:

$$A/A' = 1.600$$

$$B/B' = 3.542$$

Also the value C becomes:

$$C = (1/g)^2 = 1.555$$

In this embodiment, the ratio A/A' is close to the value C while B/B' is not so close to C, but the values E, E' indicating the level of chromatic aberration correction are respectively 1.029, 2.278, indicating that a practically acceptable level of the chromatic aberration correction is achieved by the optical element 10-1 only.

On the other hand, in the optical element 10-2, effective chromatic aberration correction is realized by employing the results obtained by solving the equations (6) for $r_1$, $r_k$ under the condition L=T=0, and by placing the center of curvature of the entrance surface substantially at the object point and also placing the center of curvature of the exit surface substantially at the image point.

In the present embodiment, as explained in the foregoing, the correction of the chromatic aberration over the entire optical system is achieved by combining two optical elements 10-1, 10-2 each of which is corrected for the chromatic aberration.

In the present embodiment, a converter lens has been explained as the example of the substantially afocal system, but this embodiment is likewise applicable to an observation system such as a Galileo finder.

The present embodiment is an example of effectively correcting the chromatic aberration by satisfying the conditions therefor. However, in an afocal converter with the angular magnification g smaller than 1, since the ratio of the equation (8) is equal to the square of the angular magnification g, it is possible, in forming a compact and thin optical system by employing a convex entrance surface with a positive refractive power, to achieve the chromatic aberration correction at the same time, if $|g|<1$, by employing a concave exit surface and adopting a condition $|r_1|<|r_k|$. Such chromatic aberration correction can also be achieved, in the case of $|g|>1$, by employing a concave exit surface and adopting a condition $|r_1|>|r_k|$.

[Embodiment 5]

Figure 15:
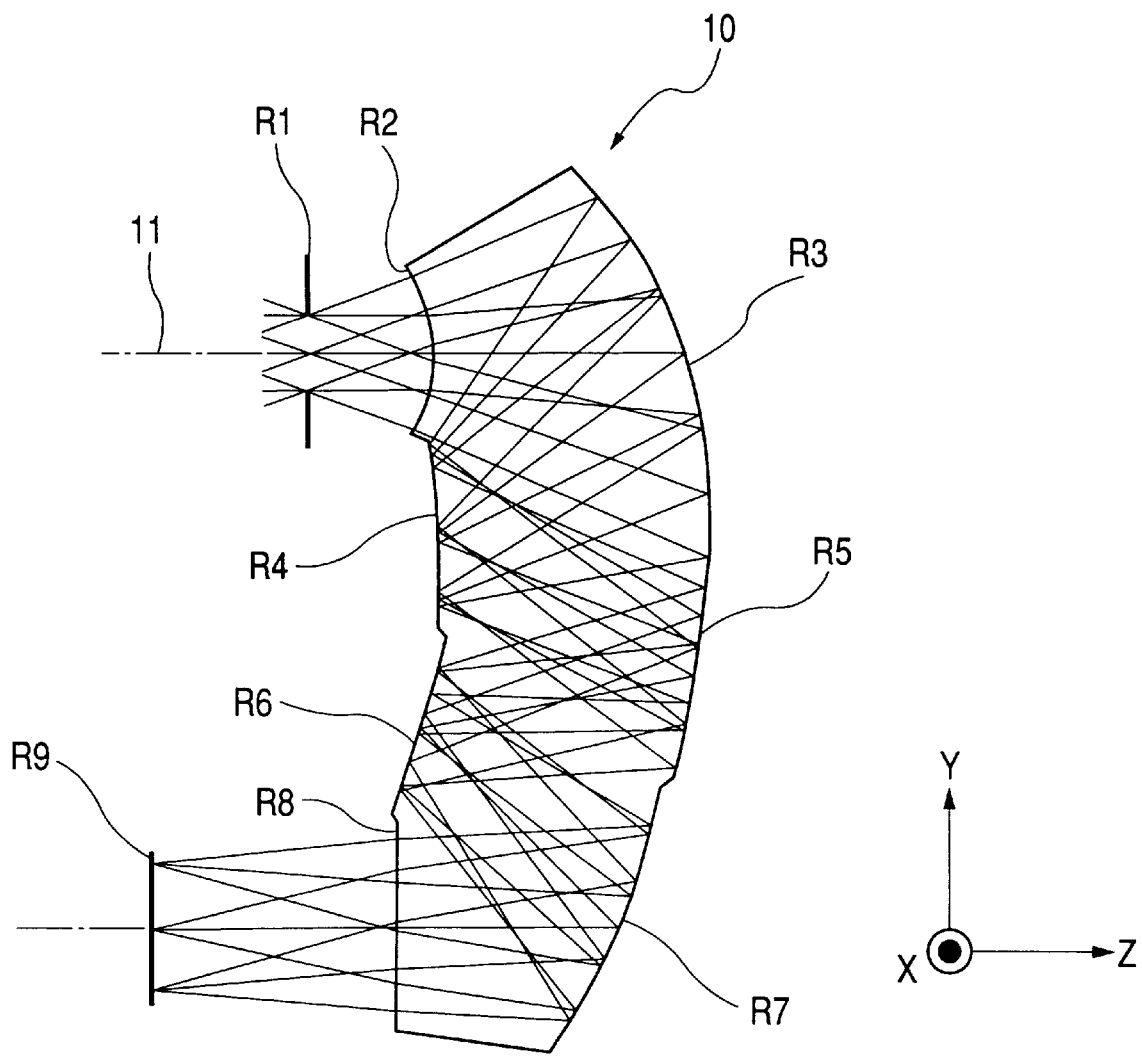
FIG. 15 is a cross-sectional view of an embodiment 5 of the optical system of the present invention.
Figure 16:
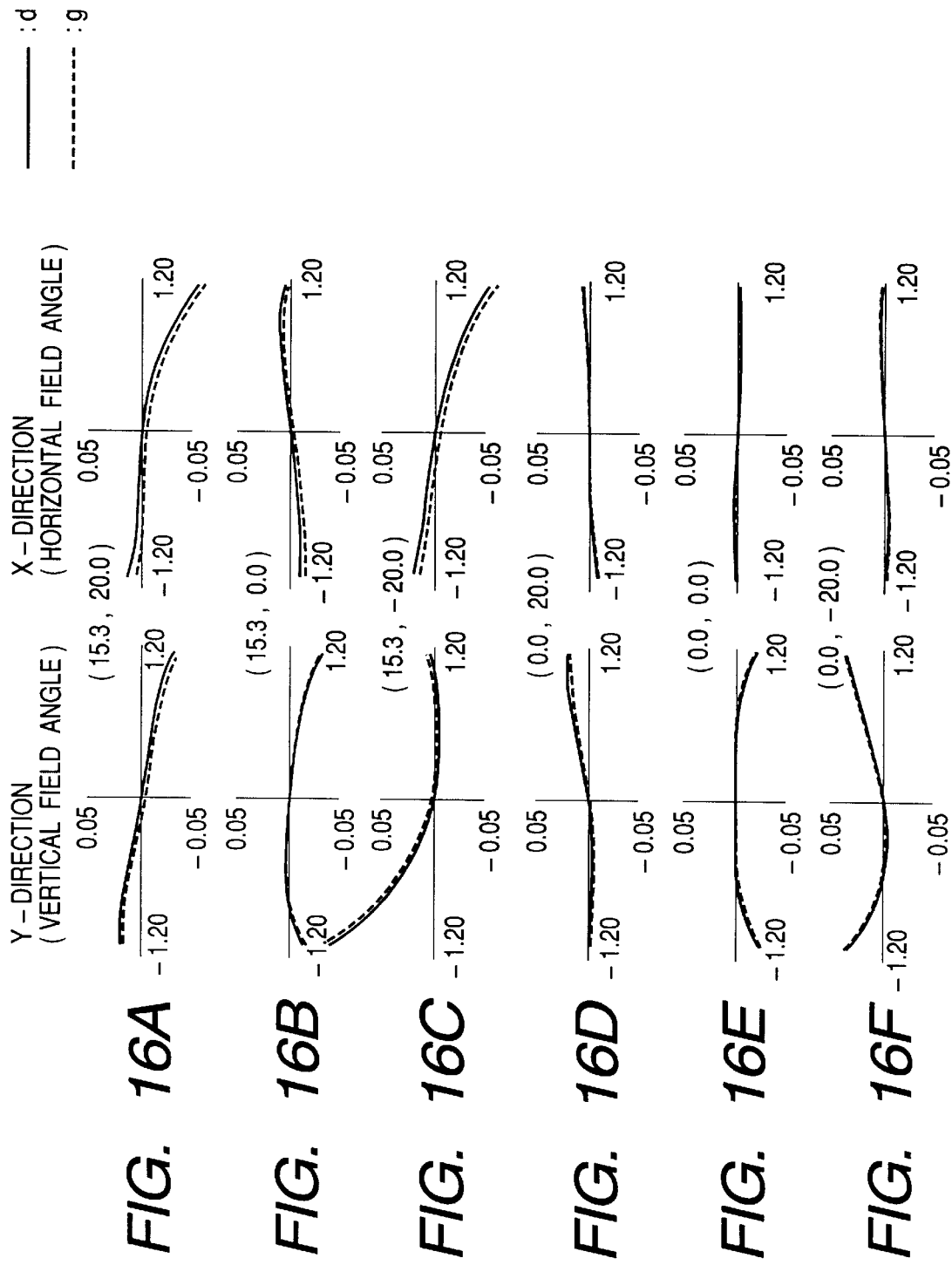
FIGS. 16A, 16B, 16C, 16D, 16E and 16F are charts showing the ray aberrations of the embodiment 5.
Figure 17:
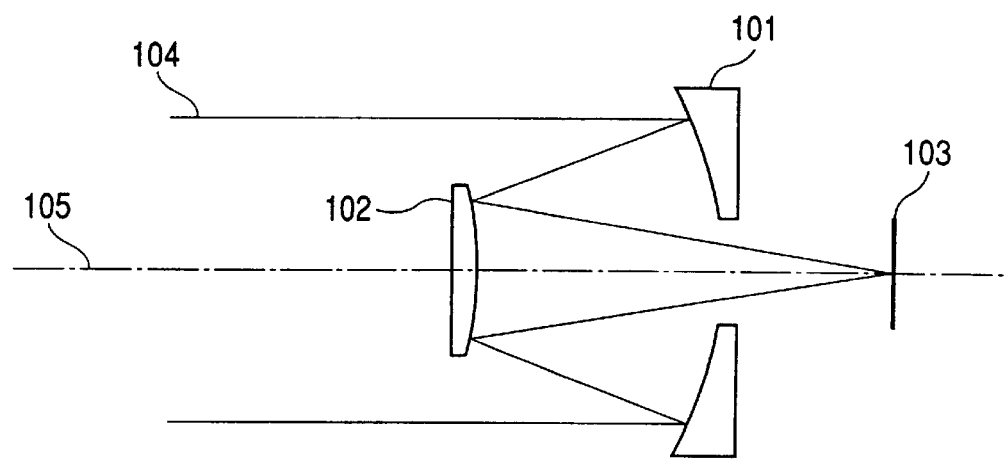
FIG. 17 is a view showing the basic configuration of a Cassegrain telescope.
Figure 18:
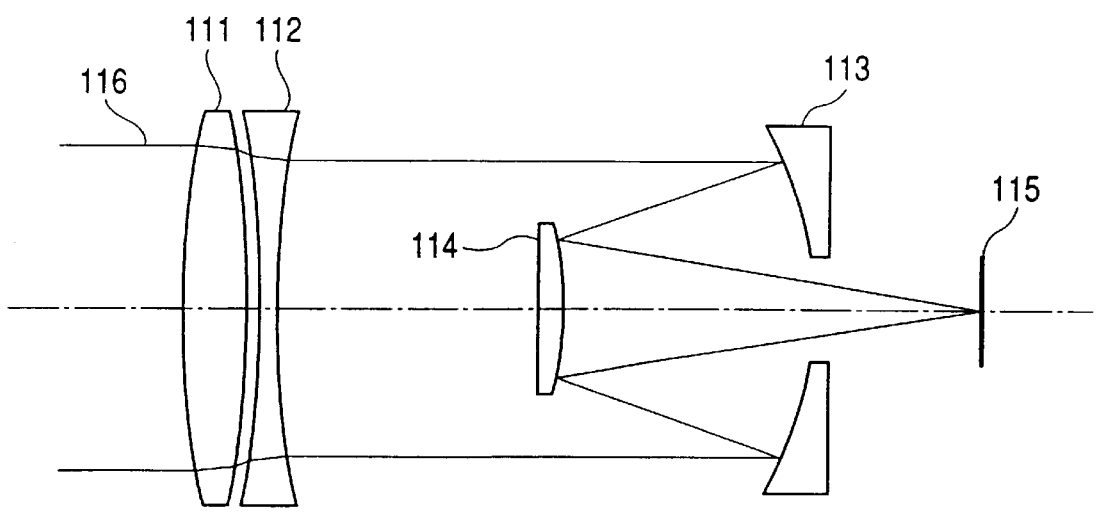
FIG. 18 is a view showing the basic configuration of a catadioptoric telescope.
Figure 19:
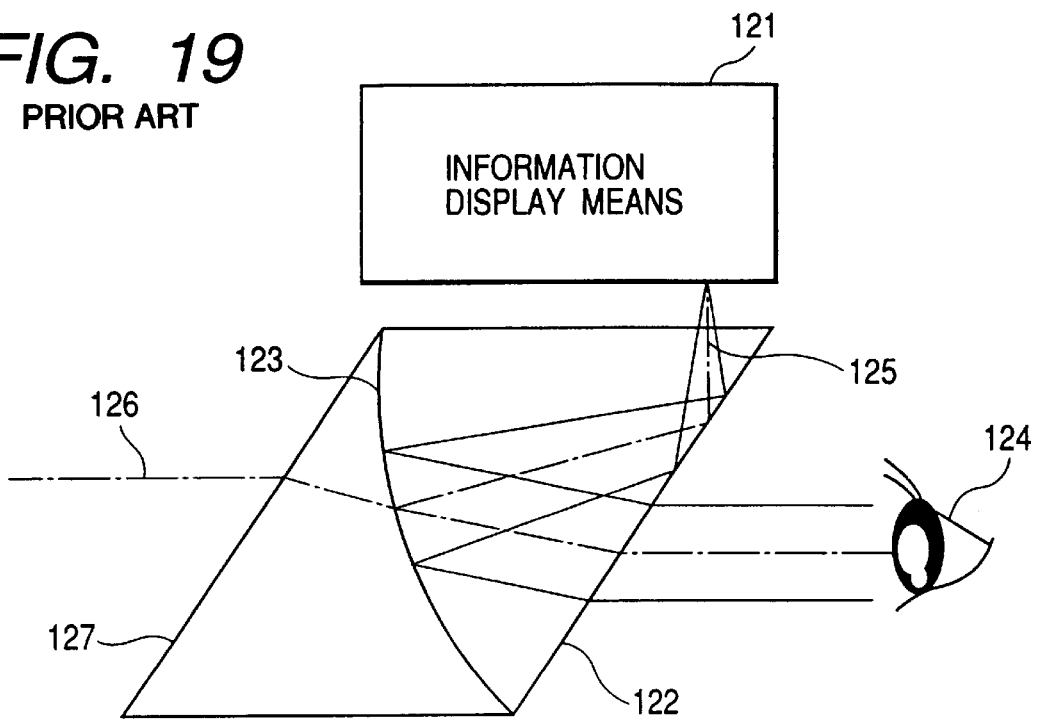
FIG. 19 is a view showing the configuration of an observation optical system having a curvature on a reflective prism surface.
Figure 20:
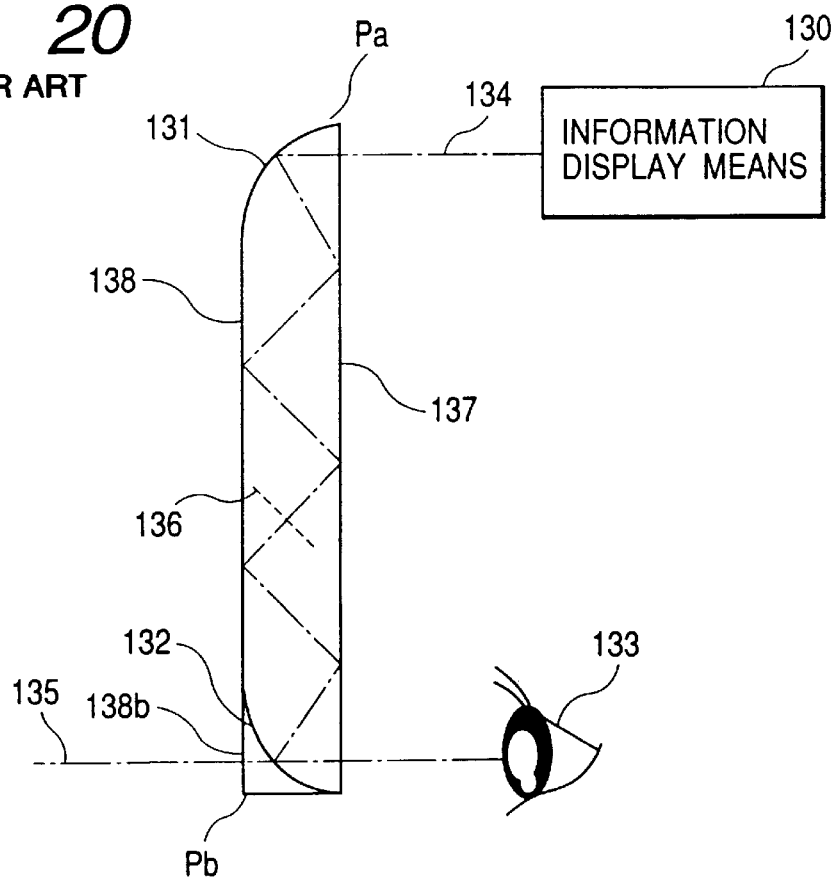
FIG. 20 is a view showing the configuration of another observation optical system having a curvature on a reflective prism surface.

FIG. 15 is a cross-sectional view, along the YZ plane, of an embodiment 5 of the optical system of the present invention. The present embodiment is composed of an optical elements 10 and constitutes an image taking optical system with a horizontal field angle of 40.0° and a vertical field angle of 30.6°. FIG. 13 also shows the optical paths. The parameters of the present embodiment are shown in the following:

horizontal semifield angle: 20.0 vertical semifield angle: 15.3 diaphragm diameter: 2.40 image size: 4 mm horizontal×3 mm vertical

| i | Yi | Zi | θi | Di | Ndi | νdi | |
|---|---|---|---|---|---|---|---|
| 1 | 0.00 | 0.00 | 0.00 | 4.00 | 1 | | diaphragm |
| optical element 10 | | | | | | | |
| 2 | 0.00 | 4.00 | 0.00 | 8.00 | 1.51633 | 64.15 | refractive surface |
| 3 | 0.00 | 12.00 | 18.00 | 9.72 | 1.51633 | 64.15 | reflective surface |
| 4 | −5.71 | 4.14 | 3.00 | 9.33 | 1.51633 | 64.15 | reflective surface |
| 5 | −10.38 | 12.22 | −10.00 | 8.84 | 1.51633 | 64.15 | reflective surface |
| 6 | −11.91 | 3.52 | −18.00 | 8.91 | 1.51633 | 64.15 | reflective surface |
| 7 | −18.32 | 9.70 | −23.00 | 6.98 | 1.51633 | 64.15 | reflective surface |
| 8 | −18.32 | 2.73 | 0.00 | 7.99 | 1 | | refractive surface |
| 9 | −18.32 | −5.26 | −0.00 | | 1 | | imaging plane | spherical surface

R2  r2 = −4.794
R8  r8 = ∞ aspherical surface

| R3 | $C_{02} = -3.22332e-02$ | $C_{20} = -4.00388e-02$ | |
| --- | --- | --- | --- |
| | $C_{03} = -4.39987e-05$ | $C_{21} = -3.25408e-04$ | |
| | $C_{04} = -4.26387e-05$ | $C_{22} = -1.23649e-04$ | $C_{40} = -6.25106e-05$ |
| R4 | $C_{02} = -1.77837e-02$ | $C_{20} = -8.44999e-02$ | |
| | $C_{03} = 1.43145e-03$ | $C_{21} = -4.71937e-03$ | |
| | $C_{04} = -4.58550e-04$ | $C_{22} = -3.01562e-03$ | $C_{40} = -8.66502e-04$ |
| R5 | $C_{02} = -1.80116e-02$ | $C_{20} = -3.15053e-02$ | |
| | $C_{03} = 1.62048e-04$ | $C_{21} = -1.04045e-03$ | |
| | $C_{04} = -8.46914e-05$ | $C_{22} = -6.00274e-05$ | $C_{40} = -6.57416e-05$ |
| R6 | $C_{02} = -6.98876e-03$ | $C_{20} = -1.96174e-02$ | |
| | $C_{03} = -5.38637e-04$ | $C_{21} = -4.49553e-03$ | |
| | $C_{04} = -1.94460e-04$ | $C_{22} = -3.36767e-04$ | $C_{40} = -3.06141e-04$ |
| R7 | $C_{02} = -2.17188e-02$ | $C_{20} = -2.38344e-02$ | |
| | $C_{03} = -1.87755e-04$ | $C_{21} = -1.24235e-03$ | |
| | $C_{04} = -2.82657e-05$ | $C_{22} = 1.78803e-05$ | $C_{40} = -2.89348e-05$ |

Referring to FIG. 15, the optical element 10 is provided with plural curved reflective surfaces and is composed of a transparent member such as glass. The optical element 10 is surfacially provided, in the passing order of the light from the object, with a concave refractive surface (entrance surface) R2, five reflective surfaces, namely a concave mirror R3, a reflective surface R4, a concave mirror R5, a reflective surface R6 and a concave mirror R7, and a flat refractive surface (exit surface) R8. There are also shown a diaphragm (entrance pupil) R1, positioned at the object side of the optical element 10, a final image plane R9 where the image taking plane of an image sensor, such as a CCD, is located, and a reference axis 11 of the optical system.

The entrance refractive surface R2 is rotationally symmetrical, and all the reflective surfaces are symmetrical with respect to the YZ plane.

In the following there will be explained the imaging function of the present embodiment. A light beam from the object is limited by the diaphragm (entrance pupil) R1, then enters the optical element 10 through the entrance surface R2, then reflected by the surfaces R3 and R4, once focused in the vicinity of the surface R4, then reflected in succession by the surfaces R5, R6 and R7, and emerges from the exit surface R8, thus being re-focused on the final image plane R9.

Consequently, in the present embodiment, the optical element 10, utilizing the refractive powers of the entrance and exit surfaces and the intermediate plural curved reflective surfaces thereof, functions as a lens unit having a desired optical performance and an imaging function with an equivalent focal length $f_{eq}=-5.544$.

FIGS. 16A to 16F are ray aberration plots of the present embodiment.

In the following there will be explained the effects of the present embodiment. In the following description, the entrance surface R2 of the optical element 10 is referred to as the surface 1, while the exit surface (R8) is referred to as the surface k. In the present embodiment, with respect to the object distance $s_1$ of the entrance surface and the image distance $s_k'$ of the exit surface, the radius $r_1$ of curvature of the entrance surface, the entrance pupil distance $t_1$, the radius $r_k$ of curvature of the exit surface and the exit pupil distance $t_k'$ are so suitably selected as to satisfy the conditions of the equations (8) and (10), thereby effectively correcting the chromatic aberration generated at the refractive surfaces.

More specifically, as the object distance at the entrance surface is infinite, there stands $1/s_1=0$. On the other hand, the image distance at the exit surface is $s_k'=D8=7.99$. In consideration of these values, there are selected $r_1=-4.794$, $r_k=0$ (flat), and the diaphragm is so designed as to provide $t_1=-4.00$ and $t_k'=-45.30$ to obtain the following parameters:

$$A=(1/r_1-1/s_1)=1/(-4.794)-0=-0.209$$

$$A'=(1/r_k-1/s_k')=0-1/7.99=-0.125$$

$$B=(1/s_1-1/t_1)=0-1/(-4.000)=0.250$$

$$B'=(1/s_k'-1/t_k')=1/7.99-1/(-45.30)=0.147$$

which provide substantially the same ratios:

$$A/A'=1.667$$

$$B/B'=1.698$$

each of which is substantially equal to the value C:

$$C=(s_k'/f_{eq})^2=2.077$$

Also the values E, E' indicating the level of chromatic aberration correction are respectively 0.802 and 0.818.

The foregoing embodiments have shown configurations in which the entrance and exit surfaces of the optical element are composed of spherical or flat planes, but effective correction of the chromatic aberration can be attained also in an optical element employing other curved surfaces such as an aspherical surface based on a spherical plane or an anamorphic surface, by designing the optical system so as to satisfy the aforementioned conditions.

In the following there are summarized the values E, E' representing the conditions of chromatic aberration correction in the optical elements of the foregoing embodiments:

|  | E | E' |
|---|---|---|
| embodiment 1 | 1.000 | 1.000 |
| embodiment 2 | 0.995 | 0.814 |
| embodiment 3 | 0.510 | 0.402 |
| embodiment 4 | 1.029 | 2.278 |
| embodiment 5 | 0.802 | 0.818 |

In the present invention, the above-mentioned values E, E' are ideally equal to 1 or substantially equal to 1, but, in practice, the effect of chromatic aberration correction can be obtained if the values E, E' satisfy the following relations:

$$0.5<E<2.0$$

$$0.3<E'<2.3$$

Outside these conditions, the magnification chromatic aberration and the axial chromatic aberration become undesirably large.

What is claimed is:

1. An optical system comprising:

an optical element having an entrance surface, a curved internal reflective surface, and an exit surface on the surface of a transparent member, wherein the light beam from an object is refracted at said entrance surface, thus entering the interior of said optical element, then is internally reflected by said reflective surface and refracted at said exit surface, thus emerging from said optical element and focusing on an imaging plane, wherein a reference axis is defined by the path of a ray emerging from the center of the object, passing through the center of a diaphragm and reaching the center of said image plane, and the distance is measured along said reference axis, wherein parameters A, A', B, and B' are defined by:

$$A=(1/r_1-1/s_1)$$

$$A=(1/r_k-1/s_k')$$

$$B=(1/s_1-1/t_1)$$

$$B'=(1/s_k'-1/t_k')$$

in which $r_1$ is the radius of curvature of said entrance surface, $s_1$ is the distance from said entrance surface to said object, $t_1$ is the distance from said entrance surface to the position of the entrance pupil, $r_k$ is the radius of curvature of said exit surface, $s_k'$ is the distance from said exit surface to the image, and $t_k'$ is the distance from said exit surface to the position of the exit pupil, and wherein said optical element, the object point and the image point are so selected that ratios A/A' and B/B' satisfy the following relations:

$0.5<(A/A')/C<2.0$ $0.3<(B/B')/C<2.3$ in which C is defined by:

$C=\{s_k'/(s_1*b)\}^2,$ in the case where said object distance $s_1$ and said image distance $s_k'$ are both finite and b is the image magnification of said optical element in such a state; or by:

$C=(s_k'/f_{eq})^2,$ in the case where said object distance $s_1$ is infinite while said image distance $s_k'$ is finite and $f_{eq}$ is the focal length of said optical element; or by:

$C=(f_{eq}/s_1)^2,$ in the case where said object distance $s_1$ is finite while said image distance $s_k'$ is infinite and $f_{eq}$ is the focal length of said optical element; or by:

$C=1/g^2,$ in the case where said object distance $s_1$ and said image distance $s_k'$ are both infinite and g is the angular magnification of said optical element.

2. An optical system according to claim 1, wherein said optical element includes plural reflective surfaces, containing at least an eccentric reflective surface in which the normal line thereto at the crossing point with said reference axis does not coincide with said reference axis.

3. An optical system according to claim 1, wherein the light beam from the object is intermediately focused in the interior of said optical element.

4. An optical system according to claim 1, satisfying the conditions (A/A')/C=1 and (B/B')/C=1.

5. An optical system comprising:

an optical element having a convex entrance surface, a curved internal reflective surface, and a convex exit surface on the surface of a transparent member, wherein the light beam from an object is refracted at said entrance surface, thus entering the interior of said optical element, then is internally reflected by said reflective surface and refracted at said exit surface, thus emerging from said optical element and focusing on an image plane, wherein a reference axis is defined by the path of a ray emerging from the center of the object, passing through the center of a diaphragm and reaching the center of said image plane, and the distance is measured along said reference axis, wherein parameters A, A', B, and B' are defined by:

$A=(1/r_1-1/s_1)$ $A'=(1/r_k-1/s_k')$ $B=(1/s_1-1/t_1)$ $B'=(1/s_k'-1/t_k')$ in which $r_1$ is the radius of curvature of said entrance surface, $s_1$ is the distance from said entrance surface to said object, $t_1$ is the distance from said entrance surface to the position of the entrance pupil, $r_k$ is the radius of curvature of said exit surface, $s_k'$ is the distance from said exit surface to the image, and $t_k'$ is the distance from said exit surface to the position of the exit pupil, and wherein said optical element, the object point and the image point are so selected that ratios A/A' and B/B' satisfy the following relations:

$0.5<(A/A')/C<2.0$ $0.3<(B/B')/C<2.3$ in which C is defined by:

$C=\{s_k'/(s_1*b)\}^2,$ in the case where said object distance $s_1$ and said image distance $s_k'$ are both finite and b is the image magnification of said optical element in such a state; or by:

$C=(s_k'/f_{eq})^2,$ in the case where said object distance $s_1$ is infinite while the image distance $s_k'$ is finite and $f_{eq}$ is the focal length of said optical element; or by:

$C=(f_{eq}/s_1)^2,$ in the case where said object distance $s_1$ is finite while said image distance $s_k'$ is infinite and $f_{eq}$ is the focal length of said optical element.

6. An optical system according to claim 5, satisfying the conditions (A/A')/C=1 and (B/B')/C=1.

7. An optical system comprising;

an optical element having a convex entrance surface, a curved internal reflective surface, and a substantially planar exit surface on the surface of a transparent member, wherein the light beam from an object is refracted at said entrance surface, thus entering the interior of said optical element, then is internally reflected by said reflective surface and refracted at said exit surface, thus emerging from said optical element and focusing on an image plane, wherein a reference axis is defined by the path of a ray emerging from the center of the object, passing through the center of a diaphragm and reaching the center of said imaging plane, and the distance is measured along said reference axis, wherein parameters A, A', B, and B' are defined by:

$A=-1/s_1$ $A'=(1/r_k-1/s_k')$ $B=(1/s_1-1/t_1)$ $B'=(1/s_k'-1/t_k')$ in which $r_1$ is the radius of curvature of said entrance surface, $s_1$ is the distance from said entrance surface to the object, $t_1$ is the distance from said entrance surface to the position of the entrance pupil, $r_k$ is the radius of curvature of said exit surface, $s_k'$ is the distance from said exit surface to said image, and $t_k'$ is the distance from said exit surface to the position of said exit pupil, and wherein said optical element, the object point and the image point are so selected that ratios A/A' and B/B' satisfy the following relations:

$0.5<(A/A')/C<2.0$ $0.3<(B/B')/C<2.3$ in which C is defined by:

$$C=\{s_k'/(s_1*b)\}^2,$$

in the case where said object distance $s_1$ and said image distance $s_k'$ are both finite and b is the image magnification of said element in such a state; or by:

$$C=(s_k'/f_{eq})^2,$$

in the case where said object distance $s_1$ is infinite while said image distance $s_k'$ is finite and $f_{eq}$ is the focal length of said optical element; or by:

$$C=(f_{eq}/s_1)^2,$$

in the case where said object distance $s_1$ is finite while said image distance $s_k'$ is infinite and $f_{eq}$ is the focal length of said optical element.

8. An optical system according to claim 7, satisfying the conditions (A/A')/C=1 and (B/B')/C=1.

9. An optical system comprising:

an optical element having a convex entrance surface, a curved internal reflective surface, and a concave exit surface on the surface of a transparent member, wherein the light beam from an object is refracted at said entrance surface, thus being incident on the interior of said optical element, then is internally reflected by said reflective surface and refracted at said exit surface, thus emerging from said optical element and focusing on an imaging plane, wherein a reference axis is defined by the path of a ray emerging from the center of the object, passing through the center of a diaphragm and reaching the center of said imaging plane, and the distance is measured along said reference axis, wherein parameters A, A', B, and B' are defined by:

$$A=(1/r_1-1/s_1)$$

$$A'=(1/r_k-1/s_k')$$

$$B=(1/s_1-1/t_1)$$

$$B'=(1/s_k'-1/t_k')$$

in which $r_1$ is the radius of curvature of said entrance surface, $s_1$ is the distance from said entrance surface to the object, $t_1$ is the distance from said entrance surface to the position of the entrance pupil, $r_k$ is the radius of curvature of said exit surface, $s_k'$ is the distance from said exit surface to said image, and $t_k'$ is the distance from said exit surface to the position of the exit pupil, and wherein said optical element, the object point and the image point are so selected that ratios A/A' and B/B' satisfy the following relations:

$$0.5<(A/A')/C<2.0$$

$$0.3<(B/B')/C<2.3$$

in which C is defined by:

$$C=\{s_k'/(s_1*b)\}^2,$$

in the case where said object distance $s_1$ and said image distance $s_k'$ are both finite and b is the image magnification of said optical element in such a state; or by:

$$C=(s_k'/f_{eq})^2,$$

in the case where said object distance $s_1$ is infinite while said image distance $s_k'$ is finite and $f_{eq}$ is the focal length of said optical element; or by:

$$C=(f_{eq}/s_1)^2,$$

in the case where said object distance $s_1$ is finite while said image distance $s_k'$ is infinite and $f_{eq}$ is the focal length of said optical element.

10. An optical system according to claim 9, satisfying the conditions (A/A')/C=1 and (B/B')/C=1.

11. An optical system comprising:

an optical element having a substantially planar entrance surface, a curved internal reflective surface, and a substantially planar exit surface on the surface of a transparent member, wherein the light beam from an object is refracted at said entrance surface, thus being incident on the interior of said optical element, then is internally reflected by said reflective surface and refracted at said exit surface, thus emerging from said optical element and focusing on an imaging plane, wherein a reference axis is defined by the path of a ray emerging from the center of the object, passing through the center of a diaphragm and reaching the center of said imaging plane, and the distance is measured along said reference axis, wherein parameters A, A', B, and B' are defined by:

$$A=-1/s_1$$

$$A'=-1/s_k'$$

$$B=(1/s_1-1/t_1)$$

$$B'=(1/s_k'-1/t_k')$$

in which $r_1$ is the radius of curvature of said entrance surface, $s_1$ is the distance from said entrance surface to the object, $t_1$ is the distance from said entrance surface to the position of the entrance pupil, $r_k$ is the radius of curvature of said exit surface, $s_k'$ is the distance from said exit surface to the image, and $t_k'$ is the distance from said exit surface to the position of the exit pupil, and wherein said optical element, the object point and the image point are so selected that ratios A/A' and B/B' satisfy the following relations:

$$0.5<(A/A')/C<2.0$$

$$0.3<(B/B')/C<2.3$$

in which C is defined by:

$$C=\{s_k'/(s_1*b)\}^2,$$

in the case where said object distance $s_1$ and said image distance $s_k'$ are both finite and b is the image magnification of said optical element in such a state.

12. An optical system according to claim 11, satisfying the conditions (A/A')/C=1 and (B/B')/C=1.

13. An optical system comprising:

an optical element having a substantially planar entrance surface, a curved internal reflective surface, and a concave exit surface on the surface of a transparent member, wherein the light beam from an object is refracted at said entrance surface, thus being incident on the interior of said optical element, then is internally reflected by said reflective surface and refracted at said exit surface, thus emerging from said optical element and focusing on an imaging plane, wherein a reference axis is defined by the path of a ray emerging from the center of the object, passing through the center of a diaphragm and reaching the center of said imaging plane, and the distance is measured along said reference axis, wherein parameters A, A', B, and B' are defined by:

$A=(1/r_1-1/s_1)$ $A'=(1/r_k-1/s_k')$ $B=(1/s_1-1/t_1)$ $B'=(1/s_k'-1/t_k')$ in which $r_1$ is the radius of curvature of said entrance surface, $s_1$ is the distance from said entrance surface to the object, $t_1$ is the distance from said entrance surface to the position of the entrance pupil, $r_k$ is the radius of curvature of said exit surface, $s_k'$ is the distance from said exit surface to the image, and $t_k'$ is the distance from said exit surface to the position of the exit pupil, and wherein said optical element, the object point and the image point are so selected that ratios A/A' and B/B' satisfy the following relations:

0.5<(A/A')/C<2.0

0.3<(B/B')/C<2.3 in which C is defined by:

$C=\{s_k'/(s_1*b)\}^2$, in the case where said object distance $s_1$ and the image distance $s_k'$ are both finite and b is the image magnification of the optical element in such a state; or by:

$C=(f_{eq}/s_1)^2$, in the case where said object distance $s_1$ is finite while said image distance $s_k'$ is infinite and $f_{eq}$ is the focal length of the optical element.

14. An optical system according to claim 13, satisfying the conditions (A/A')C=1 and (B/B')/C=1.

15. An optical system comprising:

an optical element having a concave entrance surface, a curved internal reflective surface, and a concave exit surface on the surface of a transparent member, wherein the light beam from an object is refracted at said entrance surface, thus being incident on the interior of said optical element, then is internally reflected by said reflective surface and refracted at said exit surface, thus emerging from said optical element and focusing on an imaging plane, wherein a reference axis is defined by the path of a ray emerging from the center of the object, passing through the center of a diaphragm and reaching the center of said imaging plane, and the distance is measured along said reference axis, wherein parameters A, A', B, and B' are defined by:

$A=(1/r_1-1/s_1)$ $A'=(1r_k-1/s_k')$ $B=(1/s_1-1/t_1)$ $B'=(1/s_k'-1/t_k')$ in which $r_1$ is the radius of curvature of said entrance surface, $s_1$ is the distance from said entrance surface to the object, $t_1$ is the distance from said entrance surface to the position of the entrance pupil, $r_k$ is the-radius of curvature of said exit surface, $s_k'$ is the distance from said exit surface to said image, and $t_k'$ is the distance from said exit surface to the position of the exit pupil, and wherein said optical element, the object point and the image point are so selected that ratios A/A' and B/B' satisfy the following relations:

0.5<(A/A')/C<2.0

0.3<(B/B')/C<2.3 in which C is defined by:

$C=\{s_k'/(s_1*b)\}^2$, in the case where said object distance $s_1$ and said image distance $s_k'$ are both finite and b is the image magnification of said optical element in such a state; or by:

$C=(s_k'/f_{eq})^2$, in the case where said object distance $s_1$ is infinite while said image distance $s_k'$ is finite and $f_{eq}$ is the focal length of said optical element; or by:

$C=(f_{eq}/s_1)^2$, in the case where said object distance $s_1$ is finite while said image distance $s_k'$ is infinite and $f_{eq}$ is the focal length of said optical element.

16. An optical system according to claim 15, satisfying the conditions (A/A')/C=1 and (B/B')/C=1.

17. An optical system according to any one of claims 3 to 16, wherein said optical element includes plural reflective surfaces, containing at least an eccentric reflective surface in which the normal line thereto at the crossing point with said reference axis does not coincide with said reference axis.

18. An optical system according to any one of claims 2 and 4 to 16, wherein the light beam from the object is intermediately focused in the interior of said optical element.

19. An optical system comprising:

an optical element having a convex entrance surface, a curved internal reflective surface, and a concave exit surface on the surface of a transparent member, wherein the light beam from an object is refracted at said entrance surface, thus entering the interior of said optical element, then is internally reflected by said reflective surface and refracted at said exit surface, thus emerging from said optical element and focusing on an imaging plane, wherein a reference axis is defined by the path of a ray emerging from the center of the object, passing through the center of a diaphragm and reaching the center of said imaging plane, and the distance is measured along said reference axis, and wherein the radius $r_1$ of curvature of said entrance surface and the radius $r_k$ of curvature of said exit surface satisfy the following relation;

$|r_1|>|r_k|$.

20. An optical system according to claim 19, wherein the optical element includes plural reflective surfaces, containing at least an eccentric reflective surface in which the normal line thereto at the crossing point with said reference axis does not coincide with said reference axis.

21. An optical system according to claim 19, wherein the light beam from the object is intermediately focused in the interior of said optical element.

22. An optical system according to claim 19, wherein parameters A, A', B, and B' are defined by:

$$A=(1/r_1-1/s_1)$$

$$A'=(1/r_k-1/s_k')$$

$$B=(1/s_a-1/t_1)$$

$$B'=(1/s_k'-1/t_k')$$

in which $s_1$ is the distance from said entrance surface to the object, $t_1$ is the distance from said entrance surface to the position of the entrance pupil, $s_k'$ is the distance from said exit surface to the image, and $t_k'$ is the distance from said exit surface to the position of the exit pupil, and wherein said optical element, the object point and the image point are selected in such a manner that ratios A/A' and B/B' satisfy the following relations:

$$0.5<(A/A')/C<2.0$$

$$0.3<(B/B')/C<2.3$$

in which C is defined by:

$$C=\{s_k'/(s_1*b)\}^2,$$

in the case where said object distance $s_1$ and said image distance $s_k'$ are both finite and b is the image magnification of said optical element in such a state; or by:

$$C=(s_k'/f_{eq})^2,$$

in the case where said object distance $s_1$ is infinite while said image distance $s_k'$ is finite and $f_{eq}$ is the focal length of said optical element; or by:

$$C=(_{eq}/s_1)^2,$$

in the case where said object distance $s_1$ is finite while said image distance $s_k'$ is infinite and $f_{eq}$ is the focal length of said optical element.

23. An optical system according to claim 22, satisfying the conditions (A/A')/C=1 and (B/B')/C=1.

24. An optical system comprising:

an optical element having a convex entrance surface, a curved internal reflective surface, and a concave exit surface on the surface of a transparent member, wherein the light beam from an object is a substantially parallel light beam and is refracted at said entrance surface, thus entering the interior of said optical element, then is internally reflected by said reflective surface and refracted at said exit surface, thus emerging from said optical element and focusing on an imaging plane, wherein a reference axis is defined by the path of a ray emerging from the center of the object, passing through the center of a diaphragm and reaching the center of said imaging plane, and the distance is measured along said reference axis, wherein the radius $r_1$ of curvature of said entrance surface, the radius $r_k$ of curvature of said exit surface, and the angular magnification g of said optical element satisfy the following relations:

$$|g|>1$$

$$|r_1|>|r_k|, \text{ and}$$

wherein said entrance surface and said exit surface are not inclined with respect to said reference axis.

25. An optical system comprising:

an optical element having a convex entrance surface, a curved internal reflective surface, and a concave exit surface on the surface of a transparent member, wherein the light beam from an object is a substantially parallel light beam and is refracted at said entrance surface, thus entering the interior of said optical element, then is internally reflected by said reflective surface and refracted at said exit surface, thus emerging from said optical element and focusing on an imaging plane, wherein a reference axis is defined by the path of a ray emerging from the center of the object, passing through the center of a diaphragm, and reaching the center of said imaging plane, and the distance is measured along said reference axis, wherein the radius $r_1$ of curvature of said entrance surface and the radius $r_k$ of curvature of said exit surface satisfy the following relations:

$$|g|<1$$

$$|r_1|<|r_k|, \text{ and}$$

wherein said entrance surface and said exit surface are not inclined with respect to said reference axis.

26. An optical system according to claim 24 or 25, wherein said optical element, the object point and the image point are so selected as to satisfy the following relations:

$$0.5<(r_k/r_1)*g^2<2.0$$

$$0.3<(t_k'/r_1)*g^2<2.3$$

in which $t_1$ is the distance from said entrance surface to the position of the entrance pupil and $t_k'$ is the distance from said exit surface to the position of the exit pupil.

27. An optical system according to claim 24 or 25, wherein said optical element includes plural reflective surfaces, containing at least an eccentric reflective surface in which the normal line thereto at the crossing point with said reference axis does not coincide with said reference axis.

28. An optical system according to claim 24 or 25, wherein the light beam from the object is intermediately focused in the interior of said optical element.

29. An optical system according to any one of claims 1 to 16 and 19 to 25, comprising a plurality of said optical elements.

30. An image taking device comprising the optical system according to any one of claims 1 to 16 and 19 to 25 and adapted to focus the image of said object on an image taking plane of an image taking medium.

* * * * *

UNITED STATES PATENT AND TRADEMARK OFFICE
CERTIFICATE OF CORRECTION

PATENT NO. : 6,097,550
DATED : August 1, 2000
INVENTOR(S) : Kimura

It is certified that error appears in the above-identified patent and that said Letters Patent is hereby corrected as shown below:

Column 6,
Line 57, "B- $(1/s_1-1/t_1)$" should read -- B= $(1/s_1-1/t_1)$ --.

Column 13,
Line 60, "1, k, " should read -- $r_1$, $r_k$ --.

Column 14,
Line 30, "I, $P_1$" should read -- I, $p_1$ --;
Line 35, "$y_1/y_k=1/b$" should read -- $y_1/y_k' =1/b$ --.

Column 18,
Line 48, "angle us." should read -- angle $u_y$. --.

Column 30,
Line 23, "elements" should read -- element --.

Column 39,
Line 39, "C= $(_{eg}/S_1)^2$," should read -- $C(f_{eg}/S_1)^2$, --.

Signed and Sealed this

Ninth Day of October, 2001

Attest:

NICHOLAS P. GODICI
Attesting Officer   Acting Director of the United States Patent and Trademark Office